(12) United States Patent
Masuda

(10) Patent No.: US 11,354,790 B2
(45) Date of Patent: Jun. 7, 2022

(54) IMAGE PROCESSING APPARATUS, IMAGE PROCESSING METHOD, AND RECORDING MEDIUM

(71) Applicant: SONY CORPORATION, Tokyo (JP)

(72) Inventor: Tooru Masuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/041,270

(22) PCT Filed: Jan. 15, 2019

(86) PCT No.: PCT/JP2019/000959
§ 371 (c)(1),
(2) Date: Sep. 24, 2020

(87) PCT Pub. No.: WO2019/193807
PCT Pub. Date: Oct. 10, 2019

(65) Prior Publication Data
US 2021/0073958 A1     Mar. 11, 2021

(30) Foreign Application Priority Data

Apr. 6, 2018   (JP) .............................. JP2018-073580

(51) Int. Cl.
*G06T 5/00* (2006.01)
*G06F 3/01* (2006.01)
*G09G 5/10* (2006.01)

(52) U.S. Cl.
CPC .............. *G06T 5/009* (2013.01); *G06F 3/011* (2013.01); *G09G 5/10* (2013.01);
(Continued)

(58) Field of Classification Search
CPC .......... G06T 5/009; G06T 2207/10016; G06T 2207/20208; G06F 3/011; G09G 5/10; G09G 2354/00
See application file for complete search history.

(56) References Cited

U.S. PATENT DOCUMENTS

| 8,698,910 B2* | 4/2014 | Aisaka ............... H04N 5/23218 348/222.1 |
| 2013/0129239 A1* | 5/2013 | Fukuhara ............... H04N 19/85 382/233 |

(Continued)

FOREIGN PATENT DOCUMENTS

| JP | 2016-004313 A | 1/2016 |
| JP | 2016-109828 A | 6/2016 |

(Continued)

*Primary Examiner* — Yu Chen
(74) *Attorney, Agent, or Firm* — Paratus Law Group, PLLC

(57) ABSTRACT

An image processing apparatus (100) includes: a variable determination unit (134) that performs, based on a distribution of luminance values of individual pixels included in a predetermined area determined according to information regarding a motion of a user out of first video data recorded in a first dynamic range, determination of a variable to be used to calculate the luminance values of the individual pixels when the first dynamic range is converted into a second dynamic range; and a converter (135) that converts the first video data into second video data displayed in the second dynamic range, based on the variable determined by the variable determination unit.

16 Claims, 12 Drawing Sheets

(52) U.S. Cl.
    CPC ............... *G06T 2207/10016* (2013.01); *G06T 2207/20208* (2013.01); *G09G 2354/00* (2013.01)

(56) References Cited

U.S. PATENT DOCUMENTS

| | | | |
|---|---|---|---|
| 2017/0236260 A1 | 8/2017 | Budagavi et al. | |
| 2017/0330312 A1* | 11/2017 | Nam | G06T 5/009 |
| 2018/0374192 A1* | 12/2018 | Kunkel | G06T 3/0087 |
| 2019/0082103 A1* | 3/2019 | Banerjee | G06T 3/4038 |
| 2019/0272626 A1* | 9/2019 | Rhee | G06T 15/506 |

FOREIGN PATENT DOCUMENTS

| | | |
|---|---|---|
| JP | 2017-022665 A | 1/2017 |
| JP | 2018-117276 A | 7/2018 |
| WO | WO 2017/116952 A1 | 7/2017 |

\* cited by examiner

FIG.10
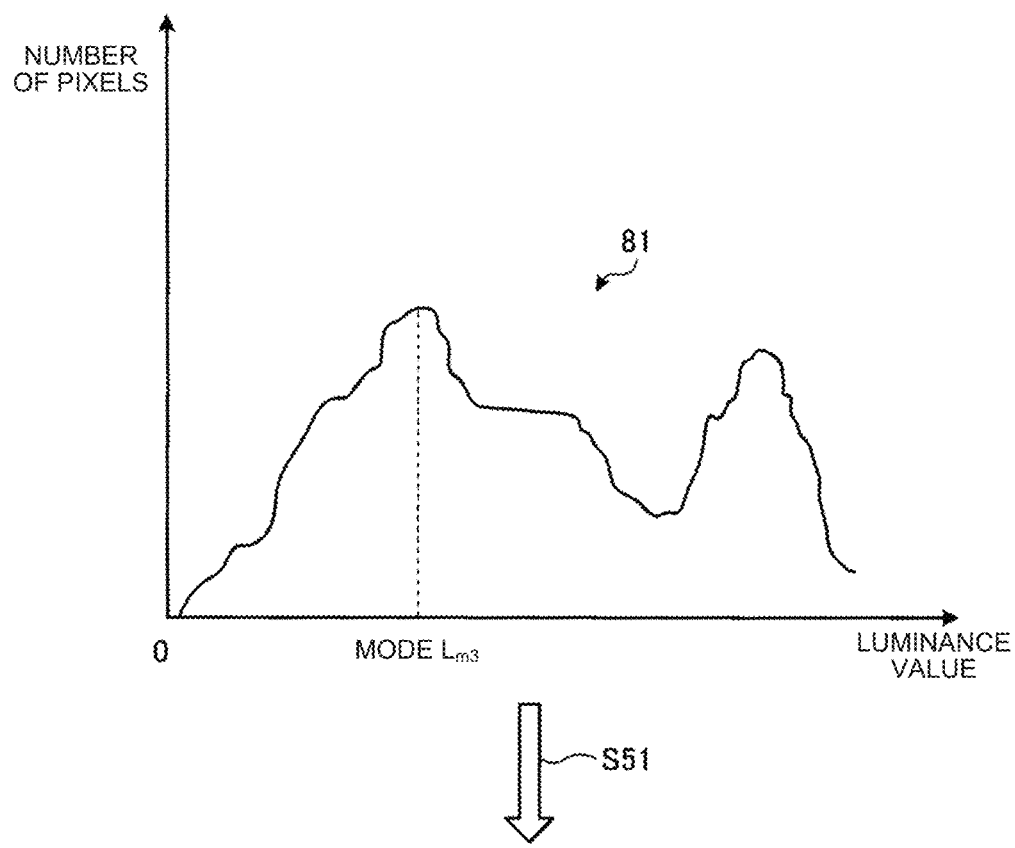
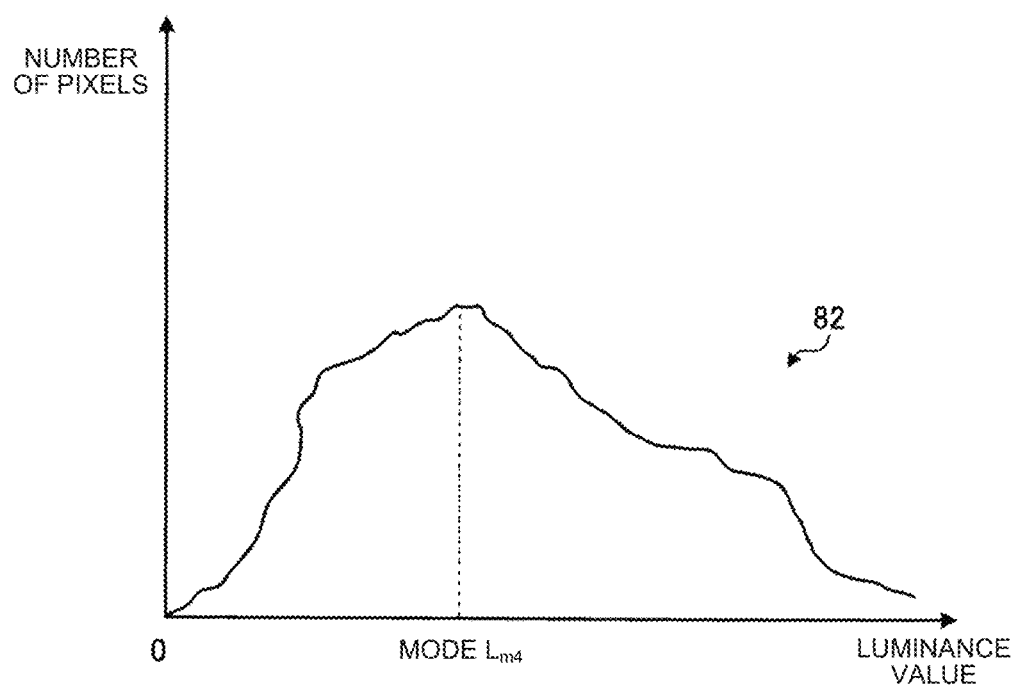

IMAGE PROCESSING APPARATUS, IMAGE PROCESSING METHOD, AND RECORDING MEDIUM

CROSS REFERENCE TO PRIOR APPLICATION

This application is a National Stage Patent Application of PCT International Patent Application No. PCT/JP2019/000959 (filed on Jan. 15, 2019) under 35 U.S.C. § 371, which claims priority to Japanese Patent Application No. 2018-073580 (filed on Apr. 6, 2018), which are all hereby incorporated by reference in their entirety.

FIELD

The present disclosure relates to an image processing apparatus, an image processing method, and a recording medium. Specifically, the present disclosure relates to conversion of the dynamic range of video data.

BACKGROUND

With the spread of virtual reality (VR) technology, spherical cameras capable of omnidirectional imaging in 360 degrees are widely used. Moreover, devices such as a head-mounted display (HMD) have begun to spread as a viewing environment for spherical content such as spherical images and spherical movies captured by a spherical camera.

Here, there is a known technology that dynamically adjusts the brightness of the image according to the user's line-of-sight direction to artificially increase the dynamic range during imaging in order to improve the visibility when viewing spherical content on the HMD.

CITATION LIST

Patent Literature

Patent Literature 1: JP 2017-22665 A

SUMMARY

Technical Problem

However, with the above-described conventional technique, it is not always possible to achieve high-clarity brightness/darkness expression of the image. For example, the related art calculates the mean of the brightness of pixels in a predetermined range of video data and then adjusts the calculated mean of the brightness to a certain range of brightness. However, uniformly adjusting the brightness of the image only changes the brightness of the entire image, and this leads to a failure in achieving high-clarity brightness/darkness expression within the image. For example, uniformly adjusting the brightness of the image might sometimes lead to a failure in preventing crushed shadows or blown-out highlights in a converted image.

Meanwhile, the above-described problem can also occur in situations other than the situation in which spherical content is viewed on an HMD. For example, when reproduction of the content in the original dynamic range is difficult in the user's viewing environment, the content is reproduced within a converted dynamic range. In a case where the dynamic range is converted at the time of reproduction of content from the time of recording of the content, high-clarity brightness/darkness expression of the converted image might not be achieved.

In view of this, the present disclosure proposes an image processing apparatus, an image processing method, and a recording medium capable of achieving a high-clarity brightness/darkness expression of an image.

Solution to Problem

According to the present disclosure, an image processing apparatus includes: a variable determination unit that performs, based on a distribution of luminance values of individual pixels included in a predetermined area determined according to information regarding a motion of a user out of first video data recorded in a first dynamic range, determination of a variable to be used to calculate the luminance values of the individual pixels when the first dynamic range is converted into a second dynamic range; and a converter that converts the first video data into second video data displayed in the second dynamic range, based on the variable determined by the variable determination unit.

(Operation) The image processing apparatus of the present disclosure performs image processing by selectively using pixels included in a predetermined area determined according to the motion of a user, rather than by the pixel information of the first video data as a whole.

Specifically, the image processing apparatus of the present disclosure dynamically determines a variable used at converting video data, based on the distribution of the luminance values of individual pixels included in a predetermined area. In this manner, the image processing apparatus according to the present disclosure uses the pixel information selected according to the motion of the user to interactively change the conversion process of the video data according to the motion of the user.

Advantageous Effects of Invention

With the image processing apparatus, the image processing method, and the recording medium according to the present disclosure, it is possible to achieve a high-clarity brightness/darkness expression of an image. It should be noted that the effects described herein are not necessarily limited and may be any of the effects described in the present disclosure.

BRIEF DESCRIPTION OF DRAWINGS

FIG. 10 is a diagram illustrating an example of image processing according to the second embodiment of the present disclosure.

DESCRIPTION OF EMBODIMENTS

Figure 1:
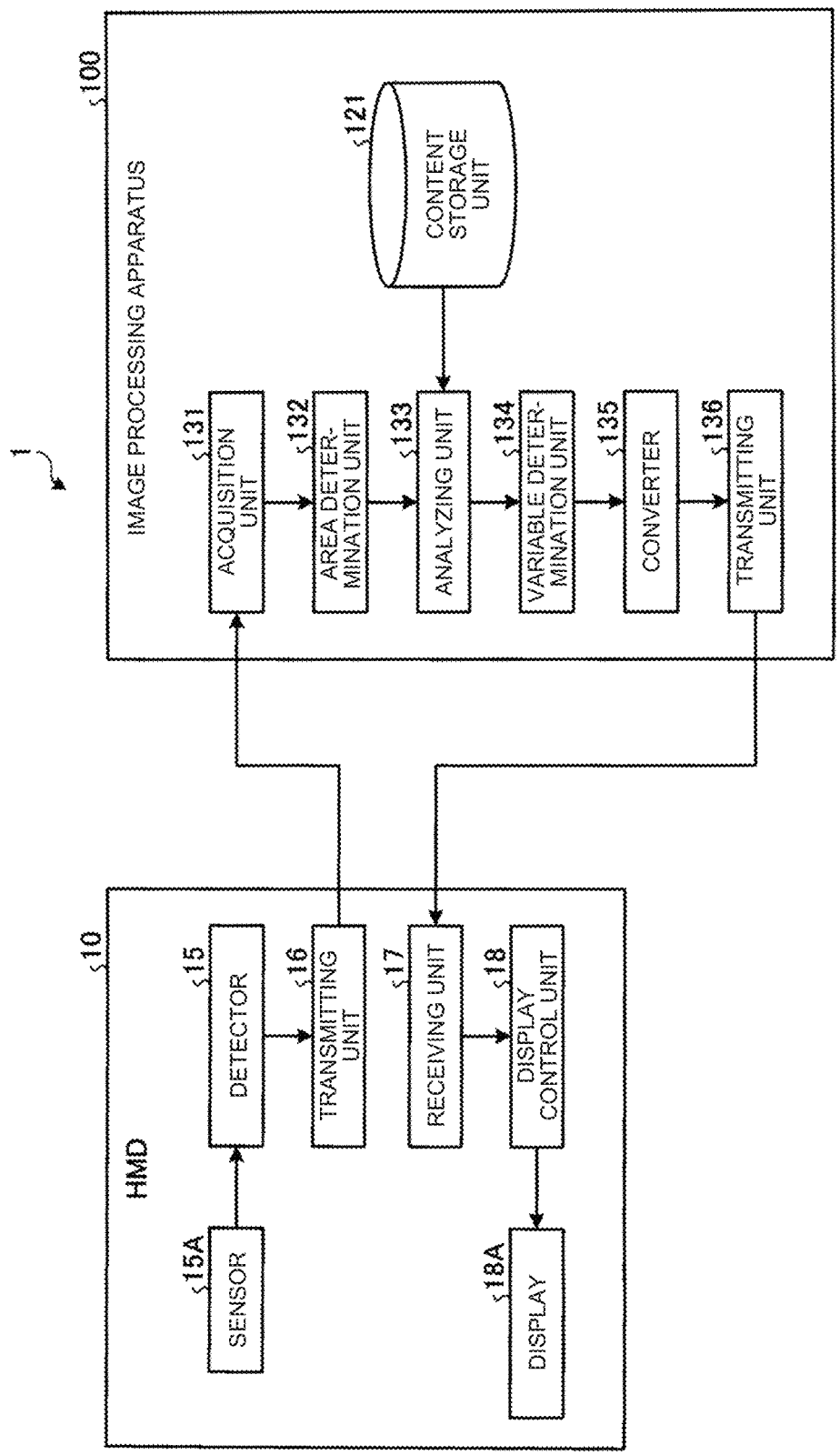
FIG. 1 is a diagram illustrating an example of an image processing system according to a first embodiment of the present disclosure.

Embodiments of the present disclosure will be described below in detail with reference to the drawings. In each of the following embodiments, the same parts are denoted by the same reference symbols, and a repetitive description thereof will be omitted.

The present disclosure will be described in the following item order.
1. First embodiment
1-1. Configuration of image processing system according to first embodiment
1-2. Example of image processing according to first embodiment
1-3. Image processing procedure according to first embodiment
2. Modification of first embodiment
3. Second embodiment
3-1. Configuration of image processing system according to second embodiment
3-2. Example of image processing according to second embodiment
3-3. Image processing procedure according to second embodiment
4. Third embodiment
4-1. Configuration of image processing system according to third embodiment
5. Other embodiments
6. Hardware configuration

1. First Embodiment

[1-1. Configuration of Image Processing System According to First Embodiment]

FIG. 1 is a diagram illustrating an example of an image processing system 1 according to a first embodiment of the present disclosure. As illustrated in FIG. 1, the image processing system 1 includes an HMD 10 and an image processing apparatus 100.

The HMD 10 is a display device mounted on the user's head and is also referred to as a wearable computer. The HMD 10 realizes display processing according to the orientation and movement of the user's body, moving speed, or the like.

The image processing apparatus 100 is an information processing device that executes image processing according to the present disclosure. The image processing apparatus 100 transmits the content held in the apparatus to the HMD 10 in response to a request transmitted from the HMD 10, for example.

The image processing apparatus 100 transmits, as content, for example, spherical content captured by a spherical camera capable of 360-degree omnidirectional imaging. In general, spherical content has a larger amount of information compared with the volume of information (image size) a display device such as the HMD 10 can display at one time. That is, since the HMD10 cannot display the entire area of the spherical content at the same time, the HMD10 displays only a partial area cut out according to the display size of the display device (in other words, the viewing angle of the user).

Here, due to a characteristic of spherical content created by omnidirectional imaging in 360 degrees, it is difficult to avoid simultaneously capturing both bright and dark locations into one image. For this reason, it is desirable that the spherical content be recorded with a wider dynamic range than ordinary content with a limited imaging range (for example, content created under an environment using adjustable exposure). For example, spherical content is preferably recorded in high dynamic range (HDR) or the like, which is a wider than standard dynamic range (SDR), which is an ordinary dynamic range.

However, the viewing environment for spherical content, such as HMD10, does not always support reproduction of the content recorded in HDR. In this case, the spherical content recorded in HDR is converted into a lower dynamic range such as SDR at the time of reproduction in accordance with the viewing environment such as the HMD10. At this time, performing conversion to SDR uniformly for entire areas of the spherical content means applying the conversion process on areas having mixture of brightness/darkness expressions, leading to a failure in obtaining a clear image. Specifically, performing conversion to SDR uniformly on entire areas of spherical content would lead to occurrence of blown-out highlights or crushed shadows, or lead to an artificial expression of areas including a mixture of brightness/darkness expressions so as to result in conversion into an unnatural image.

To handle these, the image processing system 1 according to the present disclosure extracts an area corresponding to the viewing angle of the user of the HMD 10 from the spherical content and performs interactive conversion process according to the distribution of the luminance values of the pixels included in the extracted area. With these processes, the image processing system 1 according to the present disclosure provides the user with a converted image in which brightness/darkness expression is appropriately achieved according to the visual characteristics of the user. Hereinafter, each of devices included in the image processing system 1 according to the present disclosure will be described with reference to FIG. 1.

First, the HMD 10 will be described. As illustrated in FIG. 1, the HMD 10 includes processing units such as a detector 15, a transmitting unit 16, a receiving unit 17, and a display control unit 18. Each of the processing units is implemented by execution of programs stored in the HMD 10 by a central processing unit (CPU), a micro processing unit (MPU), or the like, using random access memory (RAM) or the like, as a working area. In addition, each of the processing units may be implemented by an integrated circuit such as an application specific integrated circuit (ASIC) or a field programmable gate array (FPGA).

The detector 15 controls a sensor 15A included in the HMD 10 to detect various types of information regarding the motion of a user, such as the body orientation, inclination, movement, and moving speed of the user. Specifically, the detector 15 detects information regarding the user's head and posture, movement of the user's head and body (acceleration and angular velocity), the direction of the visual field, the speed of viewpoint movement, or the like, as the information regarding the motion of the user. For example, the detector 15 controls various motion sensors as the sensor 15A, such as a triaxial acceleration sensor, a gyro sensor, and a speed sensor, so as to detect information regarding the motion of the user. Note that the sensor 15A need not be provided inside the HMD 10 and may be an external sensor connected to the HMD 10 with wired or wireless connection, for example.

The transmitting unit 16 transmits various types of information via a wired or wireless network or the like. For example, the transmitting unit 16 transmits information regarding user's motion detected by the detector 15 to the image processing apparatus 100. Furthermore, the transmitting unit 16 transmits to the image processing apparatus 100 a request to transmit spherical content to the HMD 10.

The receiving unit 17 receives various types of information via a wired or wireless network. For example, the receiving unit 17 receives an image displayed by the display control unit 18 (more specifically, data such as pixel information displayed as an image). Specifically, the receiving unit 17 receives an image having a partial area converted to SDR by the image processing apparatus 100, out of the spherical content.

The display control unit 18 controls the display process of the image received by the receiving unit 17. Specifically, the display control unit 18 controls a process of displaying an image having a partial area converted into the SDR by the image processing apparatus 100, out of the spherical content. Specifically, the display control unit 18 controls the process of displaying the image converted into SDR onto a display 18A. The display 18A is implemented by an organic electro-luminescence (EL) display or a liquid crystal display, for example.

Although not illustrated in FIG. 1, the HMD 10 may include an input unit for receiving an operation from a user, a storage unit that stores received spherical content, an output unit having a voice output function, or the like.

Next, the image processing apparatus 100 will be described. As illustrated in FIG. 1, the image processing apparatus 100 includes processing units such as a storage unit referred to as a content storage unit 121, an acquisition unit 131, an area determination unit 132, an analyzing unit 133, a variable determination unit 134, a converter 135, and a transmitting unit 136.

The content storage unit 121 is implemented by semiconductor memory elements such as random access memory (RAM) and flash memory, or storage devices such as a hard disk or an optical disk. The content storage unit 121 stores spherical content recorded in HDR, for example. The spherical content includes video content such as still images and movies created by imaging with a spherical camera or stitching a plurality of images.

Each of the processing units such as the acquisition unit 131 is implemented by execution of programs stored in the image processing apparatus 100 (for example, an image processing program recorded in a recording medium according to the present disclosure) by the CPU, MPU, or the like, using RAM or the like as a working area. Furthermore, each processing unit may be implemented by an integrated circuit such as ASIC or FPGA.

The acquisition unit 131 acquires various types of information via a wired or wireless network or the like. For example, the acquisition unit 131 acquires the information regarding the user's motion transmitted from the HMD 10. Furthermore, the acquisition unit 131 receives a request transmitted from the HMD 10 and containing a request to transmit the spherical content to the HMD 10.

Based on the information regarding the user's motion acquired by the acquisition unit 131, the area determination unit 132 determines a predetermined area displayed on the display control unit 18 of the HMD10 (hereinafter, referred to as a "processing area" for distinction) out of the spherical content to be transmitted to the HMD10.

For example, the area determination unit 132 specifies an area in the spherical content that the user intends to view, based on the information regarding the head posture of the user wearing the HMD 10. Specifically, the area determination unit 132 specifies an area in the spherical content corresponding to the user's visual field (hereinafter, referred to as a "display area" for distinction) based on the information detected by the sensor 15A included in the HMD10. Note that various known techniques may be appropriately used for such a display area specifying process. Furthermore, the information regarding user's motion may be not only the information transmitted from the HMD10 (for example, the visual field direction estimated from the user's head and posture, or the user's motion speed) but also information calculated or estimated based on the information transmitted from the HMD10. For example, the area determination unit 132 may calculate coordinate information for specifying the display area from the spherical content based on the information transmitted from the HMD 10. In this case, the information regarding user's motion may also be rephrased as the coordinate information for specifying a display area.

Subsequently, the area determination unit 132 determines a processing area corresponding to the actual viewing environment from the display area specified on the spherical content. For example, the area determination unit 132 converts the display area specified on the image forming the spherical content (for example, equirectangular projection image, cube map image, or fisheye lens image) into a perspective projection image appropriate for the viewing angle of the HMD 10. Subsequently, the area determination unit 132 determines the perspective projection image obtained by conversion as a processing area on the HMD 10. In other words, the area determination unit 132 performs projection conversion of the display area being a part of the spherical content specified based on the information regarding user's motion so as to generate a post-projection conversion image. Subsequently, the area determination unit 132 determines the area corresponding to the post-projection conversion image generated by the projection conversion, as a processing area.

The analyzing unit 133 analyzes information regarding individual pixels included in the processing area determined by the area determination unit 132 (that is, the image obtained after projection conversion of the display area). Specifically, the analyzing unit 133 calculates the total number of pixels included in the processing area. The analyzing unit 133 also acquires the luminance values of individual pixels included in the processing area.

Here, the process performed at the time of conversion of an image from HDR to SDR is referred to as tone mapping that weights and rounds luminance values of the pixels of the HDR based on a predetermined luminance value. Hereinafter, the tone mapping process will be described step by step.

First, the analyzing unit 133 analyzes pixels within the processing area to calculate a luminance value to be used as a reference for tone mapping (hereinafter, referred to as "reference luminance"). Among various conventional techniques present for tone mapping, a method using a non-linear conversion function that allocates a large volume of information to low luminance and enhances compression of high luminance is generally considered to be closer to human visual characteristics. A known example of a conversion formula of tone mapping corresponding to such visual characteristics is Formula (1).

$$\overline{L}_\omega = \frac{1}{N}\exp(\Sigma_{x,y} \log(\delta + L_\omega(x, y))) \qquad (1)$$

In Formula (1), $L_\omega(x,y)$ represents a luminance value at an arbitrary pixel $\omega(x,y)$ included in a processing area. N represents the total number of pixels within the processing area. Furthermore, $\delta$ is an arbitrary constant for avoiding a singular point when a black pixel is present in the image, for example. As illustrated in Formula (1), $L^-_\omega$ is the logarithmic mean of the luminance values of all pixels in the processing area, and this luminance value $L^-_\omega$ is defined as the reference luminance for tone mapping in the processing area.

Tone mapping is performed by scaling the luminance values of individual pixels recorded in HDR using the reference luminance calculated by Formula (1). For example, scaling is performed using Formula (2).

$$L(x, y) = \frac{a}{\overline{L}_\omega} L_\omega(x, y) \qquad (2)$$

In Formula (2), $L(x,y)$ represents the scaled luminance of the arbitrary pixel $\omega(x,y)$. That is, the luminance value $L_\omega$ of the pixel recorded in HDR is scaled to the luminance value L of the pixel displayed in SDR through the process of Formula (2).

The value "a" in the Formula (2) represents a variable generally referred to as a key value, being a variable that determines the brightness of the entire image. Examples of conventionally set key values include "0.045", "0.09", "0.18", "0.36", or "0.72". The larger the key value, the higher the luminance value of the image displayed in the processing area, enabling display of an image with higher brightness. Note that in the image processing of the present disclosure, as will be described below in detail, the key value a in Formula (2) is not set to a conventional value but is determined by the variable determination unit 134 based on the distribution of the luminance values of individual pixels included in the processing area.

The luminance value scaled using Formula (2) is further constrained to enhance the compression of the high luminance values. For example, Formula (3) is further applied to the scaled luminance value $L(x, y)$.

$$L_d(x, y) = \frac{L(x, y)}{1 + L(x, y)} \qquad (3)$$

In Formula (3), $L_d(x,y)$ represents the luminance value of the pixel (x,y) after SDR conversion. In the present disclosure, the luminance value is represented by an arbitrary numerical value in a range 0 to 1 in both HDR and SDR using a representation method such as a floating point.

In this manner, the analyzing unit 133 specifies the display area based on the information regarding the motion of a user and further determines the reference luminance $L^-_\omega$ for the tone mapping from individual pixels included in the processing area obtained by perspective projection of the display area.

The variable determination unit 134 determines a variable used to calculate the luminance values of individual pixels at the time of conversion of the first dynamic range, based on the distribution of the luminance values of individual pixels included in the processing area, out of the first video data recorded in the first dynamic range. In the present disclosure, the first dynamic range represents HDR. In addition, the first video data represents spherical content.

That is, the variable determination unit 134 determines a variable used for calculating the luminance values of individual pixels when HDR is converted into SDR, based on the distribution of the luminance values of individual pixels included in the processing area. In the present disclosure, the variable determined by the variable determination unit 134 is the key value a illustrated in Formula (2).

For example, the variable determination unit 134 specifies the mode of the luminance values in the processing area based on the distribution of individual pixels included in the processing area. Subsequently, the variable determination unit 134 determines the key value a so that the pixels in the vicinity of the luminance of the mode are expressed in higher precision in the converted image. In other words, the variable determination unit 134 determines the key value a so that the brightness/darkness expression near the mode is represented in the contrast with higher precision in the converted image.

As an example, the variable determination unit 134 dynamically determines the key value a so that a converted luminance value $L_d$ of the pixel corresponding to the mode is set to "0.5". This is because setting $L_d(x, y)$ to "0.5" increases the bit allocation (information volume) for expressing the luminance values near the mode.

Figure 2:
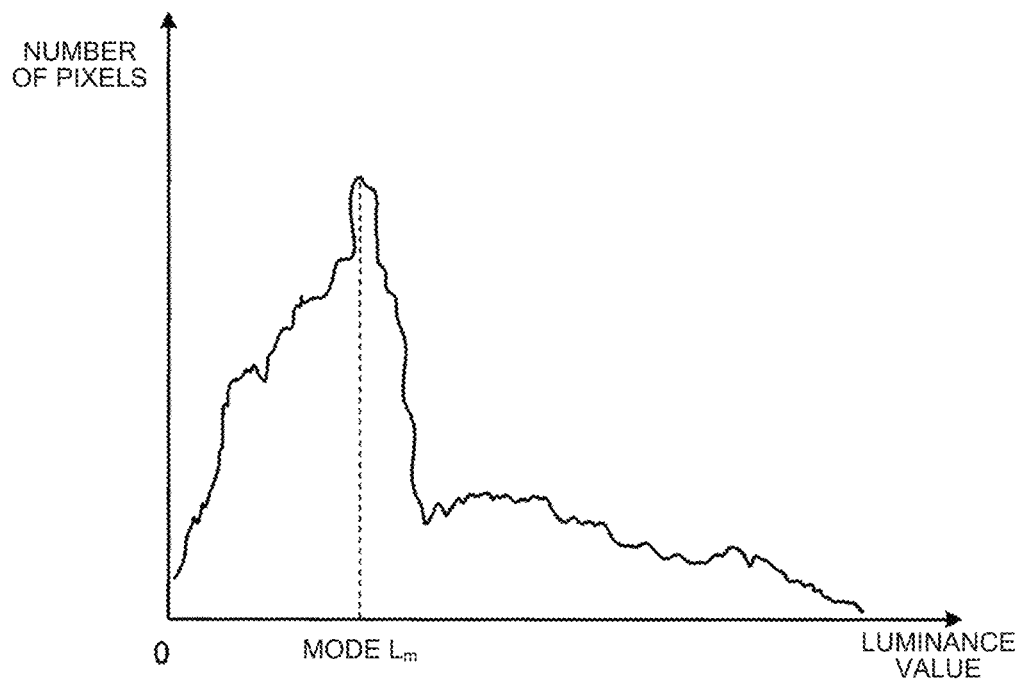
FIG. 2 is a histogram illustrating a distribution of luminance values of pixels included in an image.

This will be described with reference to FIGS. 2 and 3. FIG. 2 is a histogram illustrating a distribution of luminance values of pixels included in an image. FIG. 2 conceptually illustrates a distribution of luminance values of the pixels included in the image (processing area). In the histogram illustrated in FIG. 2, the vertical axis corresponds to the number of pixels, while the horizontal axis corresponds to the luminance value. As illustrated in FIG. 2, a relatively large number of pixels among all the pixels included in the processing area are often distributed in the vicinity of a mode $L_m$ of the luminance values, in typical cases.

Subsequently, in a case where the variable for individual pixels illustrated in FIG. 2 is dynamically determined so that the converted value of the pixel corresponding to the mode $L_m$ (that is, $L_d(x,y)$ of Formula (3)) is set to "0.5", Formula (3) will be drawn as a graph illustrated in FIG. 3. FIG. 3 is a diagram illustrating an example of image processing according to the first embodiment of the present disclosure. In the graph of FIG. 3, the vertical axis corresponds to the final pixel luminance value $L_d$ calculated by Formula (3), while the horizontal axis corresponds to the pixel luminance value L immediately after being scaled by Formula (2). As illustrated in FIG. 3, when assuming that the left side of Formula (3) in the mode $L_m$ is "0.5", a relatively large amount of information would be allocated in the vicinity of the mode $L_m$.

Figure 3:
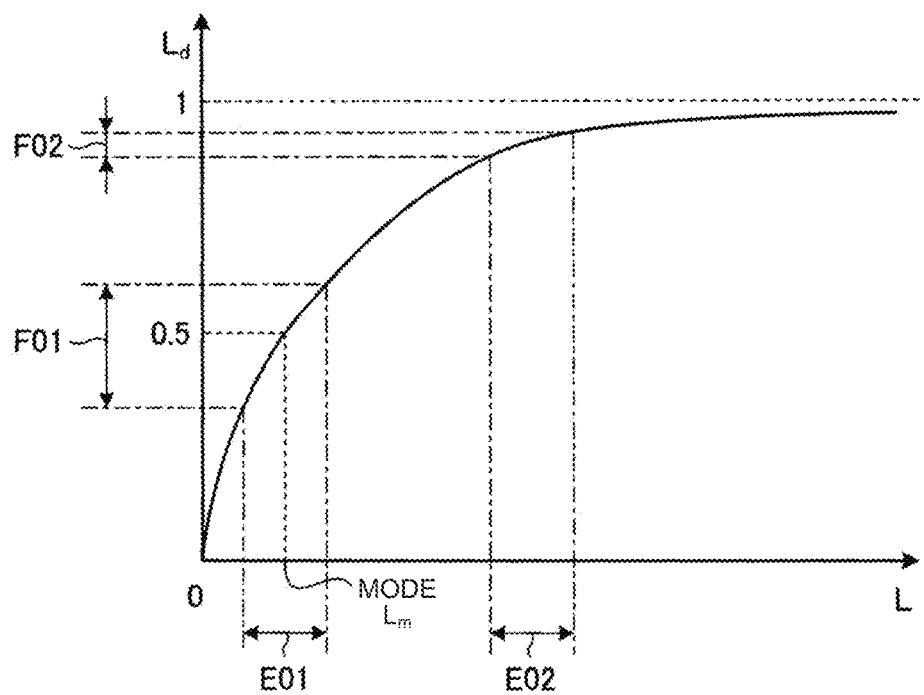
FIG. 3 is a diagram illustrating an example of image processing according to the first embodiment of the present disclosure.

For example, in the example illustrated in FIG. 3, a range E01 and a range E02 of the luminance value before conversion by Formula (3) indicate a same luminance value range (width). In contrast, a converted luminance value range F01 corresponding to the range E01 includes a wider range of luminance values than a converted luminance value range F02 corresponding to the range E02. This means that pixels having luminance values in the vicinity of the mode $L_m$ are assigned to finer gradations in SDR conversion, leading to high-clarity brightness/darkness expression in the converted image.

As described above, assuming that $L_d(x,y)$ in Formula (3) is "0.5", the key value a is expressed as follows from the Formulas (2) and (3).

$$a = \frac{\bar{L}_\omega}{L_m} \quad (4)$$

In Formula (4), "$L_m$" indicates the mode of the luminance values of each of images included in the processing area. In this manner, the variable determination unit 134 can dynamically determine the key value a, which is a variable that determines the brightness of the converted image, based on the distribution of the luminance values of individual pixels included in the processing area. Specifically, the variable determination unit 134 determines a value calculated by dividing the logarithmic mean of the luminance value (reference luminance $\bar{L}^-_\omega$) of individual pixels by the mode $L_m$ of the luminance values of individual pixels included in the processing area, as the key value a.

While Formula (4) illustrates a method of calculating the key value a in the case where the converted luminance value $L_d(x,y)$ of the mode $L_m$ is assumed to be "0.5", $L_d(x,y)$ does not necessarily have to be "0.5". For example, in order to appropriately adjust the distribution of individual pixels included in the conversion target processing area and the brightness of the entire image after conversion, the variable determination unit 134 may set the luminance value $L_d(x,y)$ after conversion of the mode $L_m$ to a value other than "0.5".

Furthermore, the variable determination unit 134 may determine the key value a in a case where the information regarding the user's motion satisfies a predetermined condition. The variable determination unit 134 may skip the process of newly determining the key value a in a case where the information regarding the user's motion does not satisfy the predetermined condition.

The information regarding user's motion includes information for determining the processing area, represented by the information regarding the head posture of the user and the motion speed of the user, for example. Furthermore, the predetermined condition is, for example, a condition that a user's motion speed or the like should satisfy.

For example, the variable determination unit 134 may make a determination of newly determining the key value a in a case where the user's motion speed is a predetermined threshold or less, as a case where a predetermined condition is satisfied. Specifically, in a case where the user's motion speed is a predetermined threshold or less, the variable determination unit 134 determines the key value a based on the distribution of the luminance values of individual pixels included in the processing area determined according to the information regarding the user's motion. The user's motion speed may be various values such as the motion speed of the HMD 10 or the angular speed of the user's head. For example, the user's motion speed may be an arbitrary speed at which the user is estimated to be gazing at a certain area of the spherical content. That is, when the user's motion speed exceeds a predetermined threshold, it is assumed that the user cannot decide which area of the spherical content to view. In contrast, when the user's motion speed is a predetermined threshold or less, it is assumed that the user is gazing at the area of the spherical content to which the line of sight is directed. Subsequently, the variable determination unit 134 executes the process of determining the key value a in a state where it can be determined that the area the user is gazing at is decided to some extent.

In contrast, it is assumed that the area the user is gazing at is not decided when the user's motion speed exceeds the predetermined threshold, and thus, the variable determination unit 134 does not need to newly determine the key value a. In a case where the process of newly determining the key value a is skipped, the converter 135 described below performs the conversion process using an existing key value a determined based on the distribution of the luminance values of individual pixels included in the processing area that satisfies a predetermined condition. For example, the converter 135 performs the conversion process using the key value a determined immediately before or a predetermined value (initial value or the like) that has been preliminarily set. In other words, the converter 135 performs the conversion process by using the existing key value a determined before the determination time point of the above-described predetermined condition.

This is because a case where the speed exceeding a predetermined threshold is observed indicates an assumable situation in which the user is moving around actively or looking around various items of spherical content. Allowing the image processing apparatus 100 to newly calculate the key value a and continue the conversion process in real time according to the line-of-sight of the user regardless of such a situation might cause occurrence of flicker in the image displayed on the HMD 10. For this reason, in the case where the user's motion speed exceeds a predetermined threshold, the variable determination unit 134 would not newly determine the key value a to suppress switching of the tone mapping process, thereby achieving prevention of flicker. Note that the threshold of the motion speed is not necessarily a constant value and may be appropriately varied depending on the scene being reproduced in the spherical content or the details of the content.

Furthermore, the variable determination unit 134 may determine whether or not to newly determine the key value a on the condition other than the motion speed of the user. For example, the variable determination unit 134 may newly determine the key value a in a case where pixel information of individual pixels included in the processing area satisfies a predetermined condition. Specifically, in a case where an amount of change in the pixel information of individual pixels included in the processing area in a predetermined time is a predetermined threshold or less, as a case where a predetermined condition is satisfied, the variable determination unit 134 may determine the key value a based on the distribution of the luminance values of individual pixels included in the processing area. The variable determination unit 134 may skip the process of newly determining the key value a in a case where the pixel information of individual pixels included in the processing area does not satisfy the predetermined condition. In a case where the determination process of the key value a is skipped, the converter 135 described below performs the conversion process using an existing key value a determined before the determination time point of the predetermined condition regarding the pixel information of individual pixels included in the processing area.

For example, in a case where the spherical content is a movie, it is assumed that the pixel information (luminance or color information) of individual pixels in the processing area frequently changes within a predetermined time (for example, several seconds). Frequently updating the key value a and the reference luminance in such a case might cause occurrence of flicker similar to the above case. To handle this, the variable determination unit 134 may determine whether or not the amount of change in the pixel information of individual pixels included in the processing area during a predetermined time is a predetermined threshold or less and may newly determine the key value a in a case where the amount of change is the predetermined threshold or less, for example.

The converter 135 converts the first video data into second video data displayed in the second dynamic range, based on the variable determined by the variable determination unit 134. In the present disclosure, the second dynamic range represents SDR, for example. Furthermore, the second video data represents an image corresponding to the processing area, being an image displayed in SDR on the HMD 10 or the like.

Specifically, the converter 135 converts the spherical content recorded in HDR into an image displayed in SDR based on the reference luminance L determined by the analyzing unit 133 and based on the key value a determined by the variable determination unit 134.

As described above, the reference luminance $L^-_\omega$ and the key value a are dynamically determined for each processing areas determined according to the user's motion. Therefore, for example, in a case where an area in which a relatively bright subject is captured (area where overall luminance value is high) matches the viewing angle, the reference luminance L becomes high, and therefore bit allocations are shifted to the high luminance side in execution of tone mapping. In this case, the converter 135 can convert an image recorded in HDR into an SDR image in which blown-out highlights are suppressed.

In contrast, in a case where an area in which a dark subject is captured (area where overall luminance value is low) matches the viewing angle, the reference luminance $L^-_\omega$ becomes low, and therefore bit allocations are shifted to the low luminance side in execution of tone mapping. In this case, the converter 135 can convert an image recorded in HDR into an SDR image in which crushed shadows are suppressed.

The transmitting unit 136 transmits the spherical content converted into SDR by the converter 135 to the HMD 10. For example, the transmitting unit 136 transmits, to the HMD 10, image data of a portion corresponding to the processing area determined according to the user's motion, out of the spherical content.

[1-2. Example of Image Processing According to First Embodiment]

Figure 4:
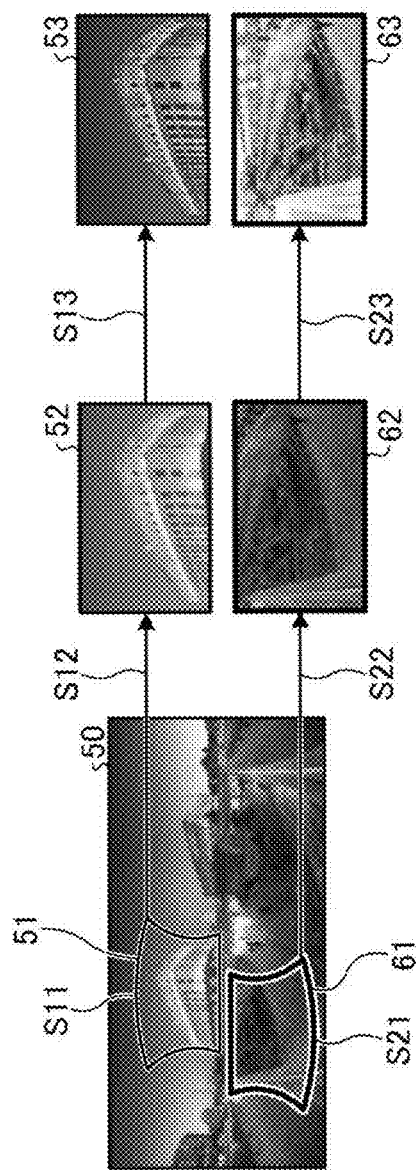
FIG. 4 is a diagram (1) illustrating an example of image processing according to the first embodiment of the present disclosure.

Image processing executed by the image processing system 1 illustrated in FIG. 1 will be specifically described with reference to FIG. 4. FIG. 4 is a diagram (1) illustrating an example of image processing according to the first embodiment of the present disclosure. An equirectangular projection image 50 illustrated in FIG. 4 is an example of an image included in the spherical content recorded in HDR.

First, the HMD 10 detects the motion of the user wearing the HMD 10. Subsequently, the HMD 10 transmits information regarding the detected motion of the user to the image processing apparatus 100. The image processing apparatus 100 specifies a display area 51 based on the information regarding the user's motion acquired from the HMD 10 (step S11).

The image processing apparatus 100 performs perspective projection conversion on the image corresponding to the display area 51 to determine the processing area corresponding to the display area 51 (step S12). In the example of FIG. 4, the image processing apparatus 100 determines a processing area 52 as the display area corresponding to the display area 51. The processing area 52 indicates an area in the HMD 10 that corresponds to the viewing angle of a user when the user actually views the image.

Furthermore, the image processing apparatus 100 converts the image of the processing area 52 into SDR based on the distribution of individual pixels included in the processing area 52 (step S13). That is, the image processing apparatus 100 performs the conversion process by using the information of individual pixels included in the processing area 52 corresponding to the image after the projection conversion, rather than using the display area 51 cut out from the equirectangular projection image 50. In this manner, the image processing apparatus 100 performs conversion process using pixel information included in the area (processing area) that the user actually views on the HMD 10, enabling providing a converted image as more natural expression to the user. Specifically, the image processing apparatus 100 dynamically determines the key value a by using the pixel information included in the area actually viewed by the user and performs conversion using the determined key value a, making it possible to provide an image achieving a brightness/darkness expression to match the visual characteristics of human.

Here, in the example of FIG. 4, the logarithmic mean or the mode of the luminance values of the pixels included in the processing area 52 is assumed to be a higher value compared with the logarithmic mean or the mode of the luminance values of the pixels included in the entire equirectangular projection image 50. In other words, the processing area 52 is an image that is brighter as compared to the entire equirectangular projection image 50. The image processing apparatus 100 performs tone mapping using the key value a determined based on the logarithmic mean luminance value or the mode of individual pixels included in the processing area 52 so as to perform conversion into SDR. As a result, as illustrated in FIG. 4, the image processing apparatus 100 can generate a converted image 53 that has been converted to improve visibility of brightness/darkness expression of the pixels having blown-out highlights in the processing area 52.

Subsequently, when the user moves the viewing field to view the area other than the display area 51, the HMD 10 detects the movement of the visual field of the user. Subsequently, the HMD 10 transmits to the image processing apparatus 100 information regarding the motion of the user who wears the HMD 10. The image processing apparatus 100 specifies a display area 61 based on the information regarding the user's motion acquired from the HMD 10 (step S21).

The image processing apparatus 100 performs perspective projection conversion on the image corresponding to the display area 61 to determine the processing area corresponding to the display area 61, similarly to the process in the display area 51 (step S22). In the example of FIG. 4, the image processing apparatus 100 determines a processing area 62 as the processing area corresponding to the display area 61.

Furthermore, the image processing apparatus 100 converts the image corresponding to the processing area 62 into SDR based on the distribution of individual pixels included in the processing area 62 (step S23). In the example of FIG. 4, the logarithmic mean or the mode of the luminance values of the pixels included in the processing area 62 is assumed to be a lower value compared with the logarithmic mean or the mode of the luminance values of the pixels included in the entire equirectangular projection image 50. In other words, the processing area 62 is an image that is darker as compared to the entire equirectangular projection image 50. The image processing apparatus 100 performs tone mapping using the key value a determined based on the logarithmic mean luminance value or the mode of individual pixels included in the processing area 62 so as to perform conversion into SDR. As a result, as illustrated in FIG. 4, the image processing apparatus 100 can generate a converted image 63 that has been converted to improve visibility of brightness/darkness expression of the pixels having crushed shadows in the processing area 62.

Figure 5:
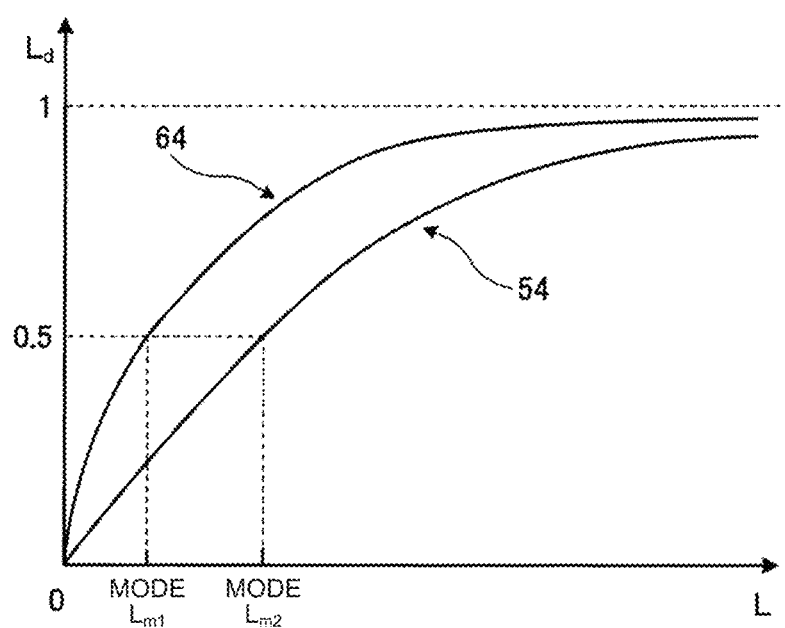
FIG. 5 is a diagram (2) illustrating an example of image processing according to the first embodiment of the present disclosure.

The above process will be described in detail with reference to FIG. 5. FIG. 5 is a diagram (2) illustrating an example of image processing according to the first embodiment of the present disclosure. In step S13 according to FIG. 4, the graph corresponding to Formula (3) is illustrated by a curve 54 illustrated in FIG. 5, for example. Furthermore, in step S23 according to FIG. 4, the graph corresponding to Formula (3) is illustrated by a curve 64 illustrated in FIG. 5, for example. In the example of FIG. 4, in comparison between the processing area 52 and the processing area 62, the processing area 62 is assumed to have a lower luminance distribution as a whole. Therefore, a mode $L_{m1}$ of the luminance values in the processing area 62 is lower than a mode $L_{m2}$ of the luminance values in the processing area 52. As described in FIG. 3, since the mode $L_{m1}$ and the mode $L_{m2}$ has the value of "0.5" as the converted luminance value, the curve 64 has a higher rate of increase (slope) in a relatively low range of the luminance value L, as compared to the curve 54, as illustrated in FIG. 5.

This means that in the conversion process of step S23, a larger volume of information (bits) is allocated to the relatively low luminance value range, as compared with the conversion process of step S13. That is, the image processing apparatus 100 performs the conversion process with more weight on the portion with a dark display level (low luminance value) in the processing area 62. This enables the image processing apparatus 100 to generate the converted image 63 in which the portion of the processing area 62 having a dark display level is displayed with high-clarity brightness/darkness expression. On the other hand, in the conversion process of step S13, a larger volume of information is allocated to the range of relatively high luminance value, as compared with the conversion process of step S23. That is, the image processing apparatus 100 performs the conversion process with more weight on the portion with a bright display level (high luminance value) in the processing area 52. This enables the image processing apparatus 100 to generate the converted image 53 in which the portion of the processing area 52 having a bright display level (for example, a portion with the luminance value having a possibility of blown-out highlights) is displayed with high-clarity brightness/darkness expression.

[1-3. Procedure of Image Processing According to First Embodiment]

Figure 6:
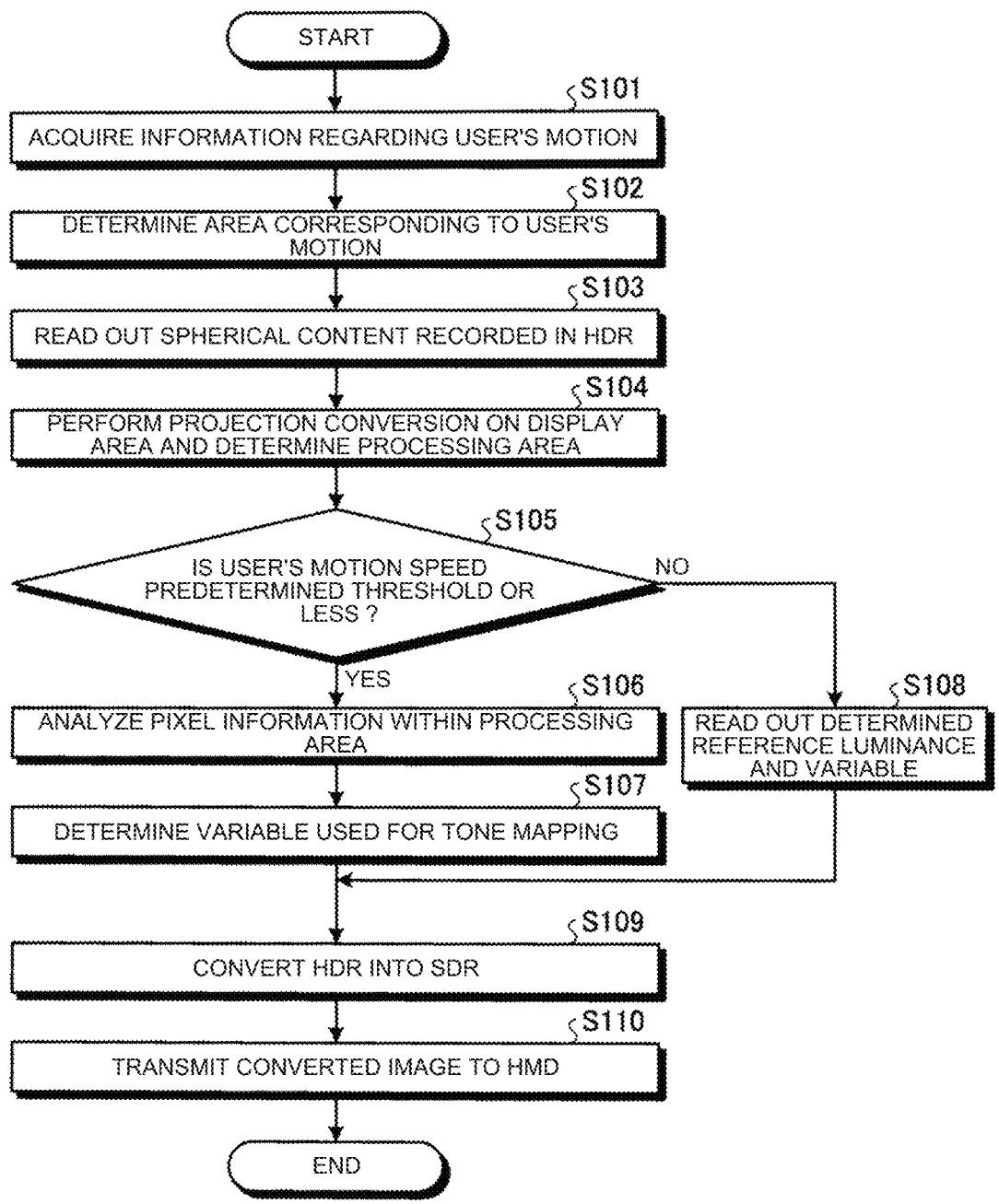
FIG. 6 is a flowchart illustrating an example of a flow of a process according to the first embodiment of the present disclosure.

Next, an image processing procedure according to the first embodiment will be described with reference to FIG. 6. FIG. 6 is a flowchart illustrating a flow of a process according to the first embodiment of the present disclosure.

As illustrated in FIG. 6, the image processing apparatus 100 acquires information regarding a user's motion from the HMD 10 (step S101). Subsequently, the image processing apparatus 100 specifies an area corresponding to the user's motion (for example, the user's visual field direction) within one image of the spherical content, based on the information regarding the user's motion (step S102). The area specified in step S102 is, for example, the display area 51 or the display area 61 illustrated in FIG. 4.

Subsequently, the image processing apparatus 100 reads out the spherical content recorded in HDR from the content storage unit 121 (step S103). Furthermore, the image processing apparatus 100 performs projection conversion on the area specified in step S102 to determine a processing area corresponding to the area (step S104). The processing area determined in step S104 corresponds to the processing area 52 or the processing area 62 illustrated in FIG. 4, for example.

Thereafter, the image processing apparatus 100 determines (step S105) whether or not the user's motion speed is a predetermined threshold or less based on the information regarding the user's motion acquired in step S101. In a case where the user's motion speed is the predetermined threshold or less (step S105; Yes), the image processing apparatus 100 analyzes the pixel information of individual pixels in the processing area (step S106). Subsequently, the image processing apparatus 100 determines a variable (key value a) used for tone mapping based on the analysis result of individual pixels (step S107).

In contrast, in a case where the user's motion speed exceeds the predetermined threshold (step S105; No), the image processing apparatus 100 reads out the already determined reference luminance and variable (step S108). In other words, the image processing apparatus 100 skips the process of newly determining (calculating) the reference luminance or variables. In this case, the image processing apparatus 100 uses the reference luminance and the variable determined in the immediately preceding process or uses the reference luminance and the variable of a preset prescribed value. That is, the image processing apparatus 100 uses the existing variable that has been determined before the time point (in the example of FIG. 6, step S105) of determining whether or not to perform variable determination.

The image processing apparatus 100 converts (step S109) an image in the processing area from HDR to SDR based on the reference luminance and the variable determined in step S107 or step S108. Subsequently, the image processing apparatus 100 transmits the converted image to the HMD 10 (step S110).

In this manner, the image processing apparatus 100 according to the first embodiment performs image processing that selectively uses pixels included in the processing area determined according to the user's motion, rather than using the pixel information of the entire spherical content. Specifically, the image processing apparatus 100 according to the first embodiment dynamically determines the key value a and the reference luminance used in converting the video data, based on the distribution of the luminance values of individual pixels included in the processing area. With this process, the image processing apparatus 100 according to the first embodiment can perform the conversion process suitable to the image that the user intends to view, leading to generation of the converted image achieving a high-clarity brightness/darkness expression of the image. Furthermore, the image processing apparatus 100 according to the first embodiment performs a process of newly determining a variable in a case where the user's motion speed is a threshold or less, making it possible to prevent occurrence of flicker or the like.

2. Modification of First Embodiment

The first embodiment is an example in which the image processing apparatus 100 performs the process of determining the reference luminance and the key value a in the processing area based on the information regarding the user's motion in a case where the user's motion speed falls to a predetermined threshold or less. Here, when the motion speed falls to a threshold or below, the image processing apparatus 100 may perform processing of gradually changing the reference luminance and the key value a determined immediately before to a new reference luminance and key value a, rather than immediately determining the new reference luminance and the key value a. That is, the image processing apparatus 100 performs the conversion process over time so as to gradually transition to the converted image, rather than immediately convert the processing area. Accordingly, the image processing apparatus 100 can perform the conversion process that simulates human visual adaptation (dark adaptation or light adaptation) which occurs when a human moves from a bright place to a dark place, or the like, making it possible to provide the user with more realistic and natural image.

That is, the variable determination unit 134 according to the modification of the first embodiment determines a first variable (key value a based on the processing area before the change) and thereafter determines a second variable (based on the processing area after the change. During these processes, the variable determination unit 134 determines values to achieve stepwise transition from the first variable to the second variable. Furthermore, the converter 135 according to the modification of the first embodiment converts the first video data by sequentially using the values to achieve stepwise transition from the first variable to the second variable, determined by the variable determination unit 134.

Figure 7:
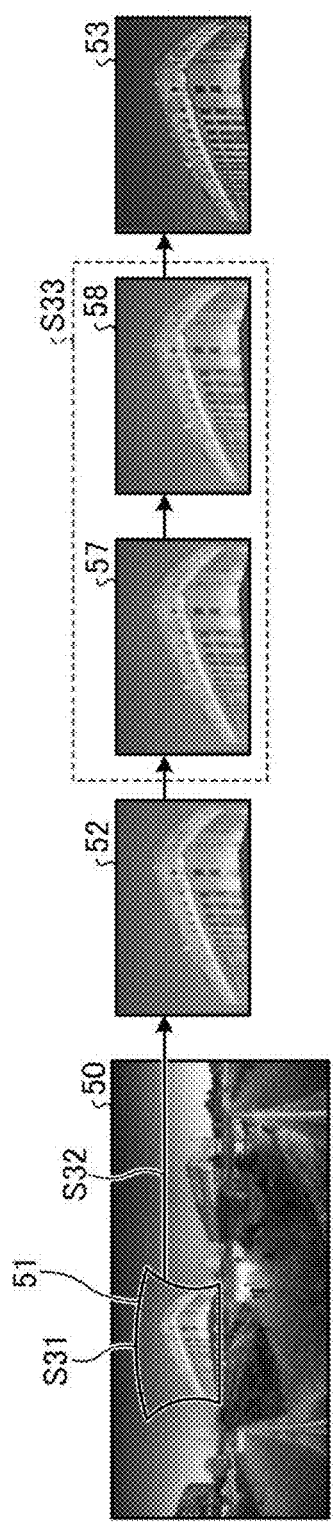
FIG. 7 is a diagram illustrating an example of image processing according to a modification of the first embodiment of the present disclosure.

The above process will be described with reference to FIG. 7. FIG. 7 is a diagram illustrating an example of image processing according to a modification of the first embodiment of the present disclosure. FIG. 7 illustrates an example in which the image processing apparatus 100 gradually changes the reference luminance and the key value a determined immediately before to the new reference luminance and the key value a so as to perform tone mapping in accordance with passage of time.

Similar to the example illustrated in FIG. 4, the image processing apparatus 100 in FIG. 7 specifies the display area 51 based on the information regarding the user's motion detected by the HMD 10 (step S31).

The image processing apparatus 100 performs perspective projection conversion on the image corresponding to the display area 51 to determine the processing area 52 corresponding to the display area 51 (step S32).

Subsequently, the image processing apparatus 100 determines the reference luminance and the key value a in the processing area 52, similarly to FIG. 4. At this time, the image processing apparatus 100 dynamically determines the reference luminance and the key value a defined in accordance with passage of time by using Formulas (5) and (6), for example.

$$\bar{L}_\omega = \bar{L}_{pre} + \Delta L(t) \quad (5)$$

$$\Delta L(t) = \frac{\bar{L}_{cur} - \bar{L}_{pre}}{T} t \quad (6)$$

In Formula (5), $\bar{L}^-_{pre}$ represents the logarithmic mean luminance value determined in the immediately preceding determination process, that is, the previous reference luminance. Furthermore, t in Formula (5) indicates the time. Furthermore, in Formula (5), $\Delta L(t)$ is a function indicating the luminance value that changes over time. Furthermore, in Formula (6), $\bar{L}^-_{cur}$ indicates the logarithmic mean luminance value corresponding to the processing area 52 determined based on the information regarding the current user's motion, that is, the reference luminance for the current time point. Furthermore, T in the Formula (6) is an arbitrary constant for determining the amount of change in the time direction.

As illustrated in Formula (5), the reference luminance $\bar{L}^-_\omega$ according to the modification is determined based on the reference luminance $\bar{L}^-_{pre}$ determined immediately before and the amount of change $\Delta L(t)$ over time. Subsequently, the image processing apparatus 100 converts the image of the processing area 52 using the reference luminance $\bar{L}^-_\omega$ in Formula (5) (step S33). With this process, in a case where the reference luminance is determined, the image in the processing area 52 is converted through an intermediate image 57 and an intermediate image 58 as illustrated in FIG. 7 to the image 53, rather than immediately converted into the converted image 53. In this case, the key value a also changes in accordance with the change in the reference luminance, as illustrated in the above Formula (4).

In this manner, in the modification of the first embodiment, the image processing apparatus 100 performs tone mapping using the reference luminance and the key value a that change over time. With this configuration, the image processing apparatus 100 can perform the conversion process from HDR to SDR by a natural expression that simulates the light adaptation and dark adaptation characteristics in human vision.

Incidentally, it is known that the time needed for dark adaptation is longer than the time needed for light adaptation in human vision. Therefore, the image processing apparatus 100 may change the value of T in Formula (6) in accordance with the relationship between $\bar{L}^-_{pre}$ and $\bar{L}^-_{cur}$. Specifically, the image processing apparatus 100 may set the value of T relatively large in a case where the relationship of $\bar{L}^-_{pre} > \bar{L}^-_{cur}$ is established, that is, when simulating dark adaptation. In this case, the image processing apparatus 100 may also set a relatively long time for the time taken before the value $\bar{L}^-_\omega$ illustrated in Formula (5) finally converges to the value $\bar{L}^-_{cur}$. Furthermore, in a case where the relationship of $\bar{L}^-_{pre} < \bar{L}^-_{cur}$ is established, that is, when simulating light adaptation, the image processing apparatus 100 may set the value T to a value smaller than the value adopted in simulating dark adaptation. In this case, the image processing apparatus 100 may also set the time taken before the value $\bar{L}^-_\omega$ illustrated in Formula (5) finally converges to the value $\bar{L}^-_{cur}$ to the value smaller than the value adopted when simulating dark adaptation (that is, set the value so as to converge to the value $\bar{L}^-_{cur}$ in a shorter time).

In addition, $\Delta L(t)$ in Formula (6) is simply expressed by a change function in the linear time direction. However, depending on the human visual characteristics and various situations reproduced in the content, ΔL(t) may be expressed by the change function in the non-linear time direction.

As described above, in a case where the key value a is newly determined, the image processing apparatus 100 performs a conversion process based on a value included between the newly determined key value a and the existing key value a that had been determined before determination of the key value a, which is determined in accordance with the passage of time.

The conversion process performed in accordance with the passage of time as described above can be triggered by various situations. For example, the image processing apparatus 100 may perform the above variable determination process and conversion process in a case where the user's motion speed falls to a predetermined threshold or below. Furthermore, the image processing apparatus 100 may perform the variable determination process and the conversion process in accordance with the transition of the displayed scene, regardless of the user's motion. For example, when the spherical content is a movie, the pixel information of the image displayed on the HMD10 might change in some cases due to scene transition (image change) even when there is no change in the motion of the user wearing the HMD10. In this case, the image processing apparatus 100 newly calculates the key value a and the reference luminance in accordance with the transition of the scene and performs the conversion process representing the light adaptation or the dark adaptation as described above, making it possible to provide the user with a more natural image. The image processing apparatus 100 may determine whether or not the scene has transitions (in other words, whether or not to perform the conversion process according to the modification) based on the occurrence of a change in the pixel information included in the immediately preceding image beyond a predetermined threshold value, for example. That is, the image processing apparatus 100 may perform the above conversion process based on the greatness of the amount of change in the pixel information of individual pixels included in the processing area beyond a predetermined threshold within a predetermined time.

In this manner, the variable determination unit 134 according to the image processing apparatus 100 newly determines the key value a in a case where the information regarding the user's motion satisfies a predetermined condition or where the amount of change in the pixel information of individual pixels included in the processing area satisfies a predetermined condition. Subsequently, in the case of newly determining the key value a, the variable determination unit 134 determines a value that achieves a stepwise change with the passage of time and that converges to the newly determined key value a. This value is calculated, for example, by assigning the reference luminance calculated by Formula (5) into Formula (4). Specifically, the variable determination unit 134 is a value that is included between the key value a and the existing key value a that had been determined before determination of the new key value a, which is determined in accordance with passage of time. Subsequently, the converter 135 of the image processing apparatus 100 converts the image corresponding to the processing area based on the value that converges to the newly determined key value a.

This enables the image processing apparatus 100 according to the modification of the first embodiment to perform a natural conversion process close to the characteristics of light adaptation and dark adaptation of human vision when converting the image recorded in HDR to SDR and displaying the image in SDR.

3. Second Embodiment

[3-1. Configuration of Image Processing System According to Second Embodiment]

Next, a second embodiment will be described. In the second embodiment, image processing that is executed when a virtual object other than spherical content is displayed on the display 18A of the HMD 10 will be described.

Figure 8:
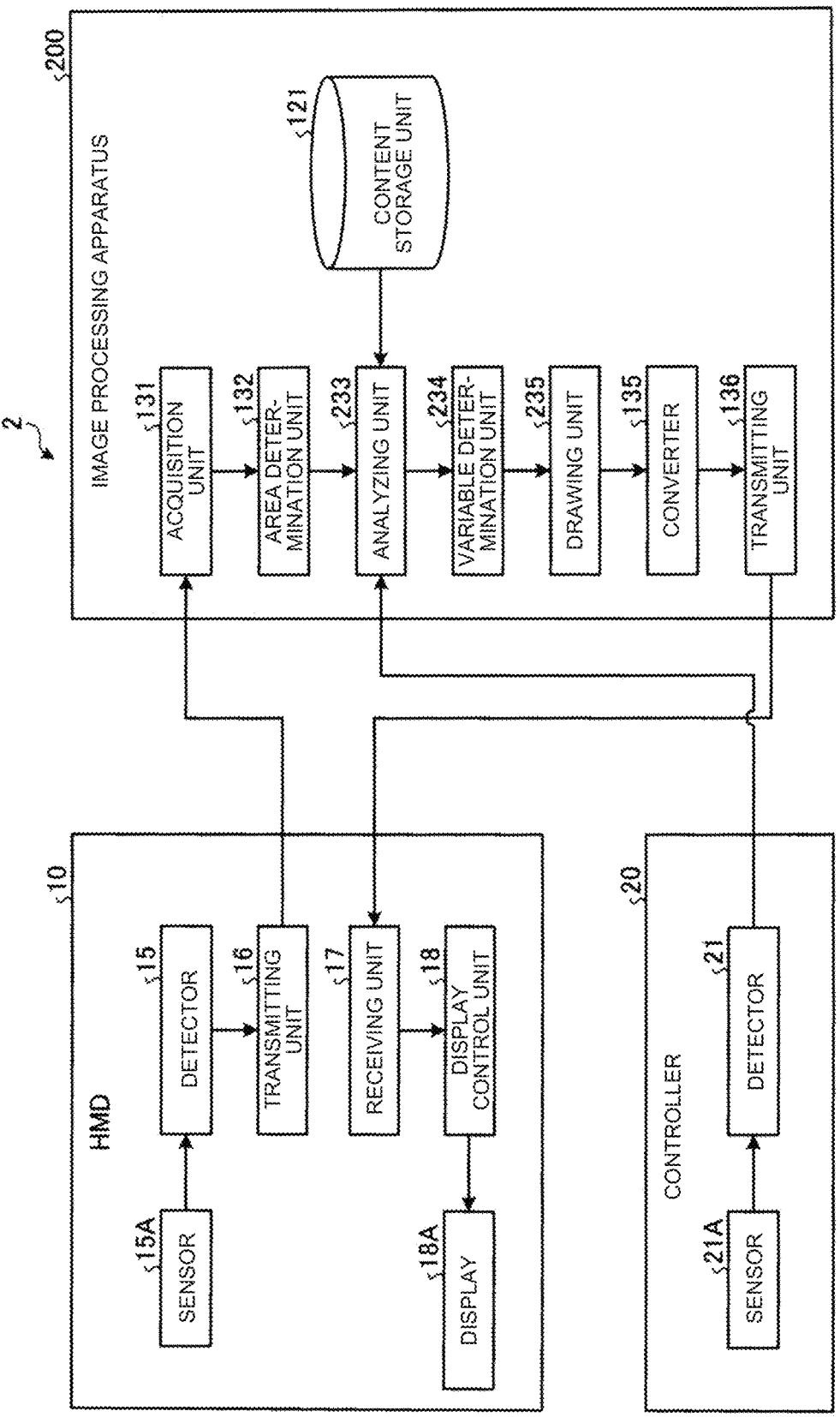
FIG. 8 is a diagram illustrating an example of an image processing system according to a second embodiment of the present disclosure.

First, an image processing system 2 according to the second embodiment will be described. FIG. 8 is a diagram illustrating an example of the image processing system 2 according to the second embodiment of the present disclosure. As illustrated in FIG. 8, the image processing system 2 further includes a controller 20 as compared with the first embodiment. The image processing apparatus 200 according to the second embodiment further includes an analyzing unit 233, a variable determination unit 234, and a drawing unit 235. Note that description of the same configuration as the image processing apparatus 100 according to the first embodiment will be omitted.

The controller 20 is an information device connected to the image processing apparatus 200 and the HMD 10 via a wired or wireless network. The controller 20 is an information device held and operated by the user wearing the HMD 10 so as to detect the movement of the user's hand and the information input to the controller 20 by the user. Specifically, a detector 21 related to the controller 20 controls a sensor 21A (for example, various motion sensors such as a triaxial acceleration sensor, a gyro sensor, or a speed sensor) to detect the three-dimensional position and speed of the controller 20. Subsequently, the detector 21 transmits the detected three-dimensional position, speed, or the like, to the image processing apparatus 200. The detector 21 may transmit the three-dimensional position of the device itself detected by an external sensor such as an external camera.

The drawing unit 235 of the image processing apparatus 200 draws a virtual object so as to be superimposed onto the image displayed on the HMD 10 based on the information detected by the detector 21 of the controller 20. The drawing unit 235 draws a virtual object that simulates the user's hand in accordance with the user's actual motion (for example, hand movement), for example. Furthermore, in a case where the content displayed on the HMD 10 is a game, the drawing unit 235 may draw a virtual object simulating a tool or the like used in the game. Note that various publicly known techniques may be appropriately used for such a virtual object drawing process.

In a case where a virtual object is included in the processing area, the analyzing unit 233 and the variable determination unit 234 according to the second embodiment perform analysis and variable determination using the luminance value set for the virtual object. Specifically, in a case where the pixels in the original image are hidden (superposed) by the virtual object in the processing area, the analyzing unit 233 or the variable determination unit 234 performs the process using the pixel information (such as the luminance value) of the virtual object.

For example, the variable determination unit 234 calculates the key value a based on the luminance values of individual pixels included in the processing area and based on the distribution of the luminance values of the virtual objects included in the processing area. The variable determination unit 234 uses a predetermined luminance value set in advance for the luminance value of the pixels forming the virtual object. Furthermore, the variable determination unit 234 may determine the luminance values of the pixels forming the virtual object, based on the luminance value of the entire image of the spherical content on which the virtual object is superimposed. This enables the variable determination unit 234 to adjust the virtual object to be drawn in a bright level when the spherical content is generally bright or adjust the virtual object to be drawn in a dark level when the spherical content is generally dark.

Furthermore, it is allowable to have a configuration in which the variable determination unit 234 will calculate the key value a when the behavior of the virtual object satisfies a predetermined condition and would not newly calculate the key value a when the behavior of the virtual object does not satisfy the predetermined condition. Specifically, in a case where the virtual object is drawn at a speed beyond a predetermined speed by the user's operation on the controller 20 at a speed beyond a predetermined threshold, the variable determination unit 234 may omit the calculation process of the key value a in order to prevent occurrence of flicker on the screen, or the like. In contrast, in a case where the virtual object is drawn at a predetermined speed or less, the variable determination unit 234 may newly determine the key value a so that the tone mapping can be performed using the new key value a.

[3-2. Example of Image Processing According to Second Embodiment]

Figure 9:
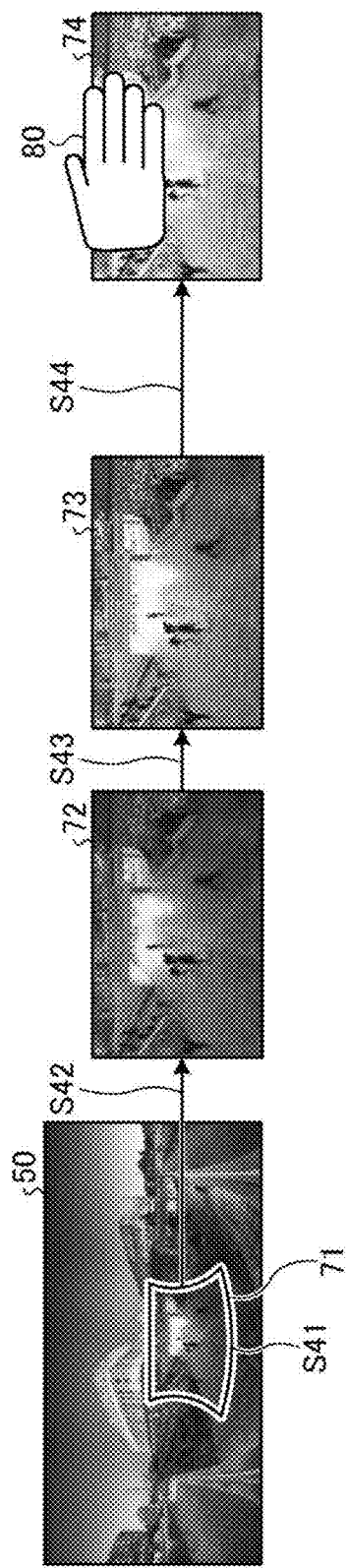
FIG. 9 is a diagram illustrating an example of image processing according to the second embodiment of the present disclosure.

The image processing executed by the image processing system 2 illustrated in FIG. 8 will be specifically described with reference to FIG. 9. FIG. 9 is a diagram illustrating an example of image processing according to the second embodiment of the present disclosure. With FIG. 9, the image processing according to the second embodiment will be described using an exemplary case where a virtual object is later superimposed on an image once converted from HDR to SDR. The equirectangular projection image 50 illustrated in FIG. 9 is the same image as that illustrated in FIG. 4.

Similar to the example illustrated in FIG. 4, the image processing apparatus 200 specifies a display area 71 based on the information regarding the user's motion detected by the HMD 10 (step S41).

The image processing apparatus 200 performs perspective projection conversion of the image corresponding to the display area 71 to determine a processing area 72 corresponding to the display area 71 (step S42).

Furthermore, the image processing apparatus 200 converts the image corresponding to the processing area 72 into SDR based on the distribution of individual pixels included in the processing area 72 (step S43). The processing area 72 illustrated in FIG. 9 has blown-out highlights in the upper center part but has relatively low luminance values in the other portions, resulting in a dark image as a whole. In contrast, in a converted image 73 after the SDR conversion, the portions having a low luminance value and a low contrast level, such as the lower central part, have been changed to have a slightly increased brightness and better clarity.

Here, it is assumed that the user performs an operation of superimposing a hand, which is a virtual object, on the converted image 73 via the controller 20. The image processing apparatus 200 derives a position where a virtual object 80 is to be superimposed on the converted image 73 based on the information detected by the controller 20.

Subsequently, the image processing apparatus 200 analyzes the image including the converted image 73 and the pixels forming the virtual object 80, as a processing target. Specifically, the image processing apparatus 200 calculates the reference luminance for tone mapping based on the luminance values of individual pixels forming the virtual object 80 and the luminance values of individual pixels included in the converted image 73. Moreover, the image processing apparatus 200 determines a key value a for tone mapping based on the luminance values of individual pixels forming the virtual object 80 and the distribution of the luminance values (mode of luminance value, etc.) of individual pixels included in the converted image 73.

Subsequently, the image processing apparatus 200 draws the virtual object 80 so as to be superimposed onto the converted image 73, while performing tone mapping based on the luminance information of individual pixels for the case of including the virtual object 80 (step S44). With this process, the image processing apparatus 200 can display a converted image 74 on the HMD 10 and display the virtual object 80 superimposed on the converted image 74.

In the converted image 74 illustrated in FIG. 9, since the upper center part of the converted image 73, which has blown-out highlights, is hidden by the virtual object 80, the distribution of the luminance value of the entire image is smoothed, leading to the clearer contrast in the display of the portion other than the virtual object 80. That is, the converted image 74 is considered to be an image that simulates on the screen a situation in which the visibility is improved at a location where the visibility is deteriorated due to the influence of light, by blocking the light with the hand in the real world.

In the example illustrated in FIG. 9, the virtual object 80 is drawn in white for the purpose of explanation, but in reality, the luminance values of the pixels forming the virtual object 80 need not have high luminance values expressed in white. For example, when determining the key value a, the variable determination unit 234 according to the second embodiment may calculate a luminance value set to individual pixels forming the virtual object 80 based on the luminance values of individual pixels included in the equirectangular projection image 50. For example, the luminance values of the pixels forming the virtual object 80 may be the mean, the median, or the logarithmic mean luminance value, or the like of the luminance values of the pixels included in the equirectangular projection image 50. This enables the image processing apparatus 200 to appropriately set the luminance values of the pixels forming the virtual object 80 to the value corresponding to the spherical content as a processing target, making it possible to prevent the execution of an unnatural conversion process due to superimposition of the virtual object 80. Note that the luminance values of the pixels forming the virtual object 80 are not necessarily the same luminance value but may be luminance values different from each other.

The process illustrated in FIG. 9 will be conceptually described with reference to FIG. 10. FIG. 10 is a diagram illustrating an example of image processing according to the second embodiment of the present disclosure. Similar to the histogram illustrated in FIG. 2, FIG. 10 illustrates the number of pixels included in the processing area and the distribution of luminance values.

For example, a curve 81 illustrated in FIG. 10 illustrates the number of pixels and the distribution of the luminance values in the converted image 73 illustrated in FIG. 9. As illustrated in FIG. 9, the converted image 73 includes a relatively large number of pixels having a high luminance value (a portion expressed in white in FIG. 9) in the upper center part. Therefore, the curve 81 has a shape indicating that a relatively large number of pixels are distributed in a high luminance value range.

Here, as illustrated in FIG. 9, it is assumed that the user operates the controller 20 to superimpose the virtual object 80 onto the upper center part of the converted image 73 (step S51). In this case, the pixels that are superimposed on the virtual object 80 out of the pixels included in the converted image 73 are replaced with the luminance values of the pixels of the virtual object 80.

For example, a curve 82 illustrated in FIG. 10 denotes the distribution of the number of pixels and the luminance value when the virtual object 80 is superimposed on the converted image 73 illustrated in FIG. 9. As illustrated in the curve 82, after the virtual object 80 is superimposed, the number of pixels having a high luminance value decreases as compared with the curve 81. Furthermore, as an effect of superimposition of the virtual object 80, the mode of the luminance values changes from a mode $L_{m3}$ to a mode $L_{m4}$ in the luminance values on the curve 81.

In this case, the image processing apparatus 200 calculates the reference luminance and the key value a based on the distribution of the luminance values of individual pixels after the virtual object 80 is superimposed and newly determines the reference luminance and the key value a. Subsequently, the image processing apparatus 200 performs tone mapping on the converted image 73 based on the newly determined reference luminance and the key value a, so as to generate the converted image 74.

[3-3. Procedure of Image Processing According to Second Embodiment]

Figure 11:
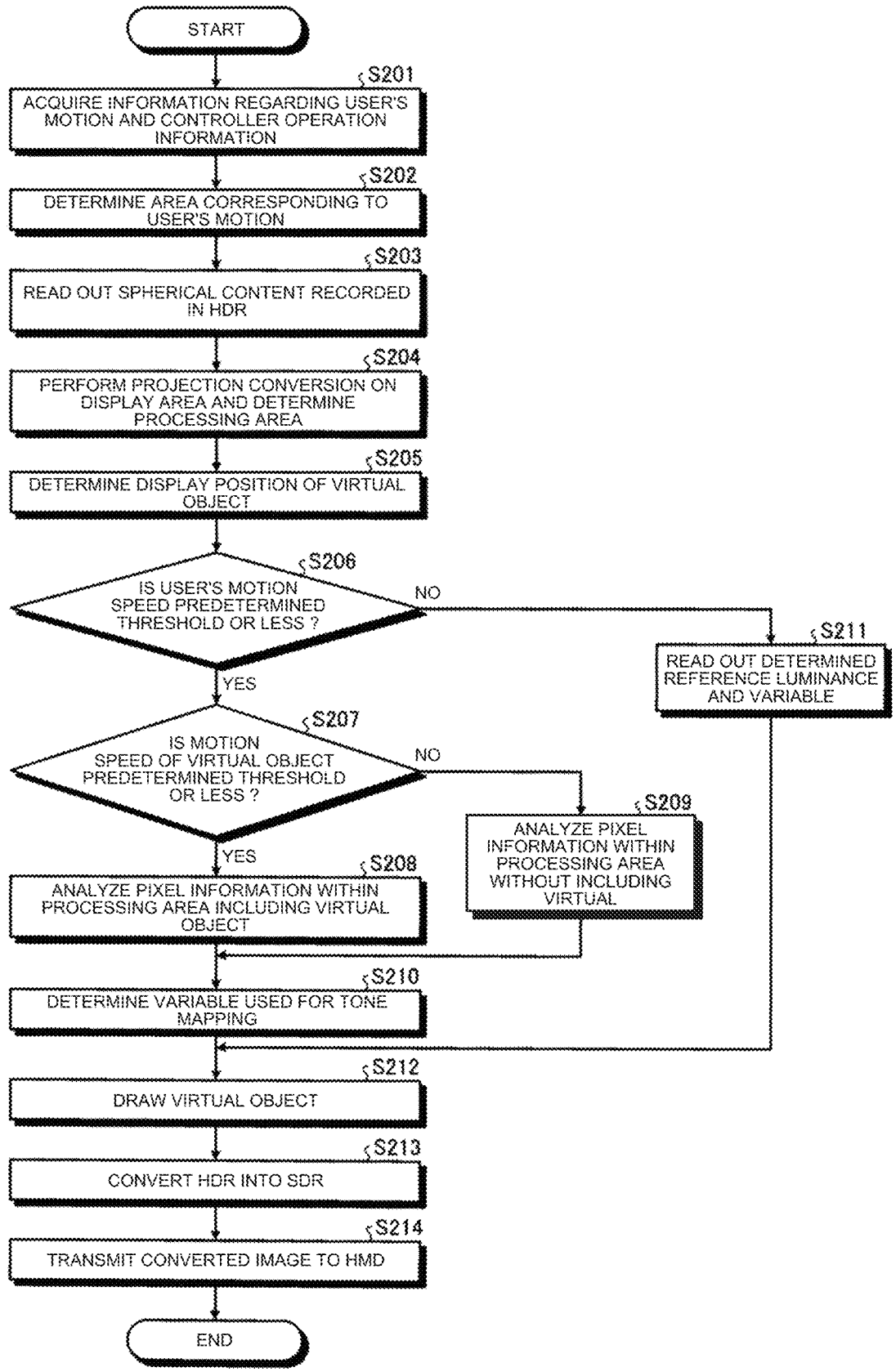
FIG. 11 is a flowchart illustrating a flow of a process according to the second embodiment of the present disclosure.

Next, an image processing procedure according to the second embodiment will be described with reference to FIG. 11. FIG. 11 is a flowchart illustrating a flow of a process according to the second embodiment of the present disclosure.

As illustrated in FIG. 11, the image processing apparatus 200 acquires information regarding a user's motion from the HMD 10 as well as acquiring controller operation information from the controller 20 (step S201). The processing of steps S202 to 204 is similar to steps S102 to 104 illustrated in FIG. 6 and thus, description will be omitted. Following step S204, the image processing apparatus 200 determines the display position of the virtual object in the processing area based on the controller operation information (step S205). Subsequently, the image processing apparatus 200 determines whether or not the motion speed of the user is a predetermined threshold or less, similar to step S105 illustrated in FIG. 6 (step S206).

In step S206, when the motion speed of the user is a predetermined threshold or less (step S206; Yes), the image processing apparatus 200 further determines whether the motion speed of the virtual object is a predetermined threshold or less (step S207). In a case where the motion speed of the virtual object is a predetermined threshold or less (step S207; Yes), the image processing apparatus 200 analyzes the pixel information in the processing area including the virtual object (step S208).

In contrast, in a case where the motion speed of the virtual object exceeds the predetermined threshold (step S207; No), the image processing apparatus 200 analyzes the pixel information in the processing area without including the virtual object (step S209).

Subsequently, the image processing apparatus 200 determines a variable used for tone mapping based on the analysis result of individual pixels in the processing area (step S210). In a case where the user's motion speed exceeds the predetermined threshold in step S206 (step S206; No), the image processing apparatus 200 reads out the already determined reference luminance and variable (step S211).

Thereafter, the image processing apparatus 200 draws the virtual object so as to be superimposed on the image of the processing area based on the three-dimensional position of the virtual object or the like (step S212). Furthermore, the image processing apparatus 200 converts (step S213) the image of the processing area from HDR to SDR based on the reference luminance and the variables determined in step S210 or step S211. Subsequently, the image processing apparatus 200 transmits the converted image to the HMD 10 (step S214).

In this manner, the image processing apparatus 200 according to the second embodiment performs image processing according to the present disclosure on an image on which a virtual object is superimposed, based on the distribution of individual pixels included in the image and the distribution of individual pixels forming the virtual object. With this configuration, the image processing apparatus 200 according to the second embodiment can perform more realistic and natural image conversion that reflects changes in the brightness/darkness expression when the sun light is blocked by hand.

4. Third Embodiment

[4-1. Configuration of Image Processing System According to Third Embodiment]

Next, a third embodiment will be described. In the third embodiment, the image processing according to the present disclosure is performed on the display device side such as the HMD 30, rather than on the server side such as the image processing apparatus 100.

Figure 12:
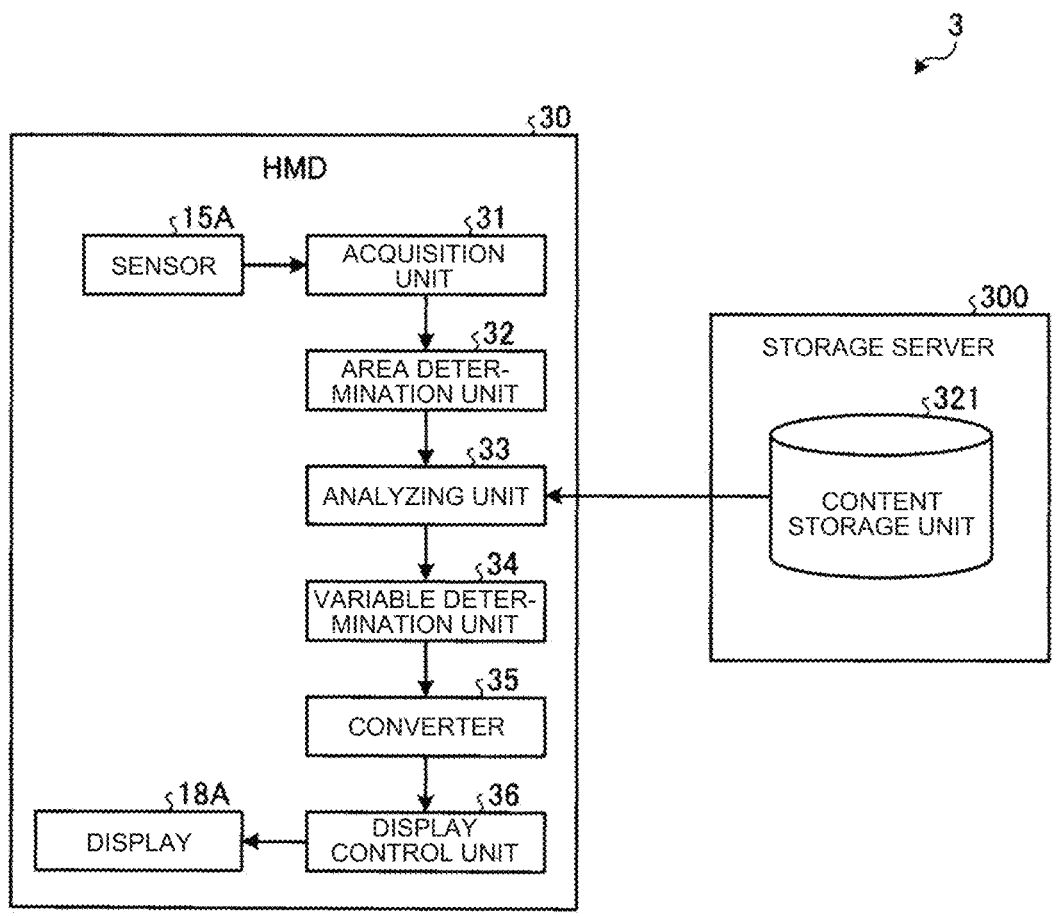
FIG. 12 is a diagram illustrating an example of an image processing system according to a third embodiment of the present disclosure.

An image processing system 3 according to the third embodiment will be described with reference to FIG. 12. FIG. 12 is a diagram illustrating an example of the image processing system 3 according to the third embodiment of the present disclosure. As illustrated in FIG. 12, the image processing system 3 includes: an HMD 30 including individual processing units included in the image processing apparatus 100 according to the first embodiment and the image processing apparatus 200 according to the second embodiment; and a storage server 300 having a content storage unit 321.

The HMD 30 is an information device that includes a display 18A that displays various types of content such as movies and still images and that performs a conversion process on an SDR image displayed on the display 18A. For example, the HMD 30 may be a smartphone VR goggle that is realized by inserting a smartphone or the like into a goggle-shaped housing.

An acquisition unit 31 corresponds to the detector 15 and the acquisition unit 131 described in the first embodiment and acquires information regarding the user's motion on the HMD 30. An area determination unit 32 corresponds to the area determination unit 132 described in the first embodiment. An analyzing unit 33 corresponds to the analyzing unit 133 described in the first embodiment. The analyzing unit 33 acquires the spherical content stored in the storage server 300 and analyzes the information of individual pixels in the processing area determined by the area determination unit 32, out of the spherical content.

A variable determination unit 34 corresponds to the variable determination unit 134 described in the first embodiment. A converter 35 corresponds to the converter 135 described in the first embodiment. A display control unit 36 controls the process of displaying the image converted by the converter 35 on the display 18A.

In this manner, the HMD 30 according to the third embodiment functions as an image processing apparatus that executes the image processing according to the present disclosure. That is, the HMD 30 can execute the image processing according to the present disclosure as a standalone device, without depending on the server device or the like. Furthermore, the HMD 30 makes it possible to realize, as standalone operation, the processes including the display control process such as displaying the image converted into SDR by the image processing according to the present disclosure on the display 18A. With this system, the HMD 30 according to the third embodiment can implement the image processing according to the present disclosure with a simple system configuration. In addition, while the third embodiment is an example in which the spherical content is held in the storage server 300, the HMD 30 may hold the spherical content in its own device.

5. Other Embodiments

The process according to each of embodiments described above may be performed in various different forms (modifications) in addition to each of embodiments described above.

For example, in each of the above-described embodiments, spherical content is illustrated as an example of content. However, the image processing according to the present disclosure can be applied to the content other than spherical content. For example, the image processing according to the present disclosure can be applied to a panoramic image or a panoramic movie having a wider area than the displayable area of the display device. Moreover, application is also possible to VR images and VR movies formed in the range of 180 degrees. The spherical content is not limited to still images and movies but may be game content created in computer graphics (CG), for example.

Furthermore, each of the above-described embodiments is an example in which the first video data recorded in HDR is converted into the second video data displayed in SDR. However, the image processing according to the present disclosure is not limited to the process of converting HDR into SDR. For example, the image processing according to the present disclosure can be applied to various types of processes for converting an image recorded with a relatively high dynamic range into a relatively low dynamic range.

Furthermore, each of the above-described embodiments is an example in which the image processing according to the present disclosure is executed based on the information of individual pixels included in the processing area corresponding to the image after the perspective projection conversion of the display area. However, the image processing according to the present disclosure may be executed by using not only the information of individual pixels included in the processing area but also the information of individual pixels of the area including a wide range of several pixels or several tens of pixels from the processing area.

Furthermore, the image processing according to the present disclosure may perform the conversion process not only on the image corresponding to the processing area but also on the image corresponding to the area including a wide range of several pixels or tens of pixels from the processing area, for example. That is, the predetermined area as an image processing target does not necessarily indicate the area of the original image after the projection conversion but may include the area obtained by expanding the area corresponding to the image after the projection conversion, by some pixels.

Furthermore, each of the above-described embodiments is an example in which tone mapping from HDR to SDR is performed based on Formulas (1) to (3) or the like. However, the conversion function of tone mapping for converting the luminance value from HDR to SDR is not limited to Formulas (1) to (3). For example, various functions such as a well-known logarithmic function, power function, and Hill function used for tone mapping may be used as the conversion function of tone mapping. In any of the functions, the image processing according to the present disclosure is realized by determining the reference luminance based on individual pixels included in the processing area after projection conversion or by determining the key value based on the distribution of individual pixels included in the processing area.

Furthermore, each of the above-described embodiments is the example in which the key value a is calculated based on Formula (4) using the mode of the luminance values of individual pixels included in the processing area. However, the key value a does not necessarily have to be calculated using the mode. For example, the key value a may be calculated using various statistically significant numerical values such as the median, the mean, and the standard deviation of the luminance values of the pixels included in the processing area.

Furthermore, the image processing according to the present disclosure has been described as the process in which the display area is specified based on the information regarding the motion of the user wearing the HMD 10 or the like (information regarding the inclination of the head posture or the line-of-sight direction). However, the information regarding the user's motion is not limited to the above. For example, in the case of displaying spherical content on a smartphone, tablet terminal, or the like, the user selects a display area by touch operation on the screen or using an input device (mouse, trackpad, or the like) in some cases. In this case, the information regarding the user's motion includes information corresponding to the touch operation and information input via the input device. Furthermore, the motion speed of the user includes information such as the speed of movement of the finger corresponding to the touch operation (in other words, the moving speed of a pointer in the tablet terminal), the moving speed of the pointer via the input device, or the like. In addition, the information regarding the motion of the user includes information detected by a sensor included in the tablet terminal when the user moves or tilts the tablet terminal. Furthermore, the information detected by the sensor may include, for example, information such as the scrolling speed of the screen (in other words, the processing area) on the tablet terminal.

Furthermore, among each process described in the above embodiments, all or a part of the processes described as being performed automatically may be manually performed, or the processes described as being performed manually can be performed automatically by the known method. In addition, the processing procedures, specific names, and information including various data and parameters illustrated in the above documents or drawings can be arbitrarily changed unless otherwise specified. For example, various information illustrated in each of drawings is not limited to the information illustrated.

In addition, each of components of each of devices is provided as a functional and conceptional illustration and thus does not necessarily need to be physically configured as illustrated. That is, the specific form of distribution/integration of each of devices is not limited to those illustrated in the drawings, and all or a part thereof may be functionally or physically distributed or integrated into arbitrary units according to various loads and use conditions. For example, the analyzing unit 133 and the variable determination unit 134 illustrated in FIG. 1 may be integrated.

Furthermore, the above-described embodiments and modifications can be appropriately combined within a range implementable without contradiction of processes.

The effects described in the present specification are merely examples, and thus, there may be other effects, not limited to the exemplified effects.

6. Hardware Configuration

Figure 13:
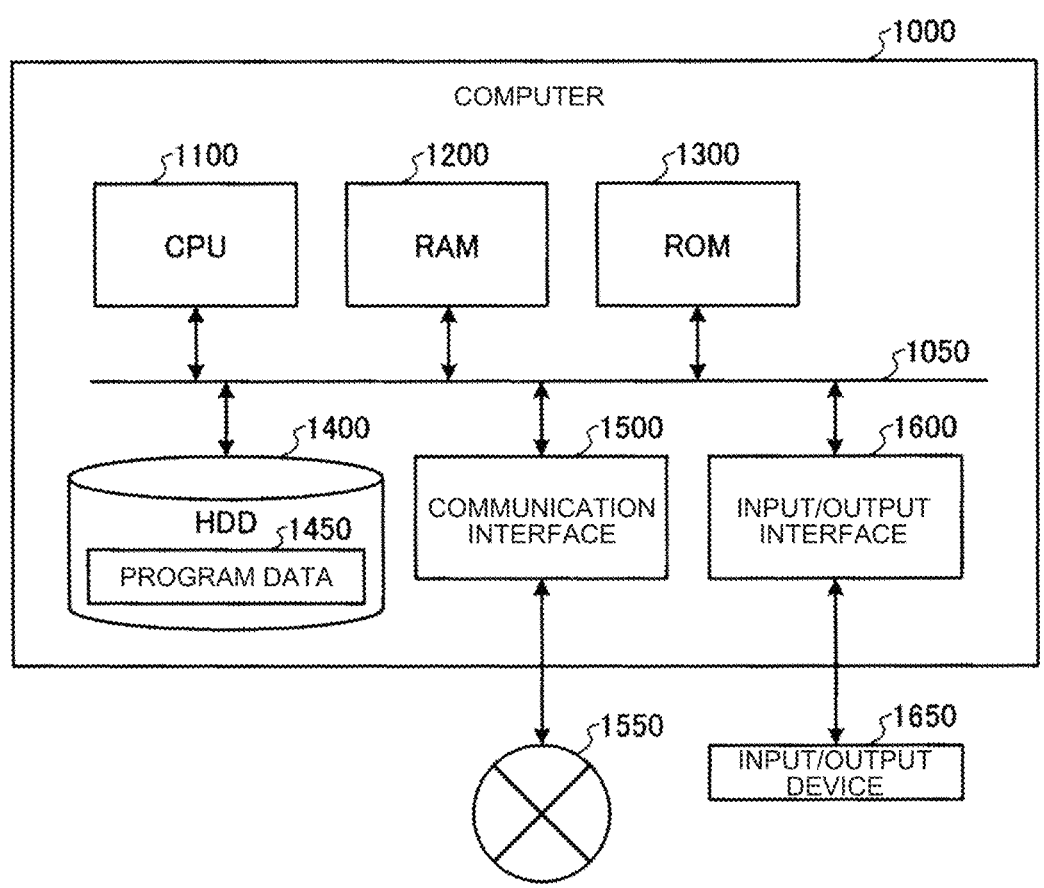
FIG. 13 is a hardware configuration diagram illustrating an example of a computer that realizes functions of an image processing apparatus.

Information devices such as the image processing apparatus, HMD, and controller according to each of the embodiments described above are implemented by a computer 1000 having the configuration as illustrated in FIG. 13, for example. Hereinafter, the image processing apparatus 100 according to the first embodiment will be described as an example. FIG. 13 is a hardware configuration diagram illustrating an example of the computer 1000 that implements the functions of the image processing apparatus 100. The computer 1000 includes a CPU 1100, RAM 1200, read only memory (ROM) 1300, a hard disk drive (HDD) 1400, a communication interface 1500, and an input/output interface 1600. Each of components of the computer 1000 is interconnected by a bus 1050.

The CPU 1100 operates based on a program stored in the ROM 1300 or the HDD 1400 so as to control each of components. For example, the CPU 1100 develops a program stored in the ROM 1300 or the HDD 1400 into the RAM 1200 and executes processes corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records an image processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting between an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on predetermined recording media. Examples of the media include optical recording media such as a digital versatile disc (DVD) or a phase change rewritable disk (PD), a magneto-optical recording medium such as a magneto-optical disk (MO), a tape medium, a magnetic recording medium, and semiconductor memory.

For example, when the computer 1000 functions as the image processing apparatus 100 according to the first embodiment, the CPU 1100 of the computer 1000 executes the image processing program loaded on the RAM 1200 to implement the functions of the acquisition unit 131 or the like. Furthermore, the HDD 1400 stores the image processing program according to the present disclosure or data in the content storage unit 121. While the CPU 1100 executes the program data 1450 read from the HDD 1400, the CPU 1100 may acquire these programs from another device via the external network 1550, as another example.

Note that the present technology can also have the following configurations.

(1)

An image processing apparatus comprising:

a variable determination unit that performs, based on a distribution of luminance values of individual pixels included in a predetermined area determined according to information regarding a motion of a user out of first video data recorded in a first dynamic range, determination of a variable to be used to calculate the luminance values of the individual pixels when the first dynamic range is converted into a second dynamic range; and a converter that converts the first video data into second video data displayed in the second dynamic range, based on the variable determined by the variable determination unit.

(2)

The image processing apparatus according to (1), wherein, in a case where the information regarding the motion of the user satisfies a predetermined condition, the variable determination unit determines the variable based on the distribution of the luminance values of the individual pixels included in the predetermined area.

(3)

The image processing apparatus according to (2), wherein, in a case where a motion speed of the user is a predetermined threshold or less as a case where the information regarding the motion of the user satisfies the predetermined condition, the variable determination unit determines the variable based on the distribution of the luminance values of individual pixels included in the predetermined area.

(4)

The image processing apparatus according to (2) or (3), wherein, in a case where the information regarding the motion of the user does not satisfy the predetermined condition, the converter converts the first video data into the second video data based on an existing variable determined before a time point of determination of the predetermined condition.

(5)

The image processing apparatus according to any one of (1) to (4), wherein, in a case where pixel information of individual pixels included in the predetermined area satisfies a predetermined condition, the variable determination unit determines the variable based on a distribution of the luminance values of individual pixels included in the predetermined area.

(6)

The image processing apparatus according to (5), wherein, in a case where an amount of change of the pixel information of individual pixels included in the predetermined area in a predetermined time is a predetermined threshold or less as a case where the pixel information of individual pixels included in the predetermined area satisfies the predetermined condition, the variable determination unit determines the variable based on the distribution of the luminance values of individual pixels included in the predetermined area.

(7)

The image processing apparatus according to (5) or (6), wherein, in a case where the pixel information of the individual pixels included in the predetermined area does not satisfy the predetermined condition, the converter converts the first video data into the second video data based on an existing variable determined before a time point of determination of the predetermined condition.

(8)

The image processing apparatus according to any one of (1) to (7), wherein, in a case where the variable determination unit has determined a second variable after determining a first variable, the variable determination unit determines values that achieve stepwise transition from the first variable to the second variable, and the converter converts the first video data into the second video data by sequentially using the values that achieves stepwise transition from the first variable to the second variable, determined by the variable determination unit.

(9)

The image processing apparatus according to any one of (1) to (8), wherein the variable determination unit determines the variable based on a value obtained by dividing a logarithmic mean of the luminance values of individual pixels included in the predetermined area by a mode of the luminance values of the individual pixels included in the predetermined area.

(10)

The image processing apparatus according to any one of (1) to (9), wherein the variable determination unit determines the variable based on a distribution of luminance values of individual pixels included in a virtual object that is superimposed on the predetermined area and individual pixels that are not superimposed on the virtual object in the predetermined area.

(11)

The image processing apparatus according to (10), wherein the variable determination unit calculates luminance values to be set for individual pixels forming the virtual object, based on luminance values of individual pixels included in the first video data.

(12)

The image processing apparatus according to (10) or (11), wherein in a case where a behavior of the virtual object satisfies a predetermined condition, the variable determination unit determines the variable based on a distribution of luminance values of individual pixels included in a virtual object that is superimposed on the predetermined area and individual pixels that are not superimposed on the virtual object in the predetermined area, and in a case where the behavior of the virtual object does not satisfy a predetermined condition, the variable determination unit determines the variable based on the distribution of the luminance values of individual pixels included in the predetermined area regardless of whether the superimposition of the virtual object is performed.

(13)

The image processing apparatus according to any one of (1) to (12), wherein the first video data is spherical content, and the image processing apparatus further comprises an area determination unit that performs projection conversion on a partial area of the spherical content specified based on the motion of the user and determines the area corresponding to the image after the projection conversion, as the predetermined area.

(14)

The image processing apparatus according to any one of (1) to (13), further comprising a display control unit that controls display of the second video data obtained by conversion by the converter.

(15)

An image processing method, by a computer, comprising:

performing, based on a distribution of luminance values of individual pixels included in a predetermined area determined according to information regarding a motion of a user out of first video data recorded in a first dynamic range, determination of a variable to be used to calculate the luminance values of the individual pixels when the first dynamic range is converted into a second dynamic range; and converting the first video data into second video data displayed in the second dynamic range, based on the determined variable.

(16)

A non-transitory computer readable recording medium recording an image processing program for causing a computer to function as:

a variable determination unit that performs, based on a distribution of luminance values of individual pixels included in a predetermined area determined according to information regarding a motion of a user out of first video data recorded in a first dynamic range, determination of a variable to be used to calculate the luminance values of the individual pixels when the first dynamic range is converted into a second dynamic range; and a converter that converts the first video data into second video data displayed in the second dynamic range, based on the variable determined by the variable determination unit.

REFERENCE SIGNS LIST 1, 2, 3 IMAGE PROCESSING SYSTEM
10, 30 HMD
20 CONTROLLER
100, 200 IMAGE PROCESSING APPARATUS
300 STORAGE SERVER
15, 21 DETECTOR
16 TRANSMITTING UNIT
17 RECEIVING UNIT
18, 36 DISPLAY CONTROL UNIT
121, 321 CONTENT STORAGE UNIT
31, 131 ACQUISITION UNIT
32, 132 AREA DETERMINATION UNIT
33, 133, 233 ANALYZING UNIT
34, 134, 234 VARIABLE DETERMINATION UNIT
35, 135 CONVERTER
136 TRANSMITTING UNIT
235 DRAWING UNIT

The invention claimed is:

1. An image processing apparatus comprising:
a variable determination unit configured to perform, based on a distribution of luminance values of individual pixels included in a predetermined area determined according to information regarding a motion of a user out of first video data recorded in a first dynamic range, determination of a variable to be used to calculate the luminance values of the individual pixels when the first dynamic range is converted into a second dynamic range; and a converter configured to convert the first video data into second video data displayed in the second dynamic range, based on the variable determined by the variable determination unit, wherein the variable determination unit is further configured to determine the variable based on a distribution of luminance values of individual pixels included in a virtual object that is superimposed on the predetermined area, and wherein the variable determination unit and the converter are each implemented via at least one processor.

2. The image processing apparatus according to claim 1, wherein, in a case where the information regarding the motion of the user satisfies a predetermined condition, the variable determination unit is further configured to determine the variable based on the distribution of the luminance values of the individual pixels included in the predetermined area.

3. The image processing apparatus according to claim 2, wherein, in a case where a motion speed of the user is a predetermined threshold or less as a case where the information regarding the motion of the user satisfies the predetermined condition, the variable determination unit is further configured to determine the variable based on the distribution of the luminance values of individual pixels included in the predetermined area.

4. The image processing apparatus according to claim 2, wherein, in a case where the information regarding the motion of the user does not satisfy the predetermined condition, the converter is further configured to convert the first video data into the second video data based on an existing variable determined before a time point of determination of the predetermined condition.

5. The image processing apparatus according to claim 1, wherein, in a case where pixel information of individual pixels included in the predetermined area satisfies a predetermined condition, the variable determination unit is further configured to determine the variable based on a distribution of the luminance values of individual pixels included in the predetermined area.

6. The image processing apparatus according to claim 5, wherein, in a case where an amount of change of the pixel information of individual pixels included in the predetermined area in a predetermined time is a predetermined threshold or less as a case where the pixel information of individual pixels included in the predetermined area satisfies the predetermined condition, the variable determination unit is further configured to determine the variable based on the distribution of the luminance values of individual pixels included in the predetermined area.

7. The image processing apparatus according to claim 5, wherein, in a case where the pixel information of the individual pixels included in the predetermined area does not satisfy the predetermined condition, the converter is further configured to convert the first video data into the second video data based on an existing variable determined before a time point of determination of the predetermined condition.

8. The image processing apparatus according to claim 1, wherein, in a case where the variable determination unit has determined a second variable after determining a first variable, the variable determination unit is further configured to determine values that achieve stepwise transition from the first variable to the second variable, and the converter converts the first video data into the second video data by sequentially using the values that achieve stepwise transition from the first variable to the second variable, determined by the variable determination unit.

9. The image processing apparatus according to claim 1, wherein the variable determination unit is further configured to determine the variable based on a value obtained by dividing a logarithmic mean of the luminance values of individual pixels included in the predetermined area by a mode of the luminance values of the individual pixels included in the predetermined area.

10. The image processing apparatus according to claim 1, wherein the variable determination unit is further configured to determine the variable based on individual pixels that are not superimposed on the virtual object in the predetermined area.

11. The image processing apparatus according to claim 10, wherein the variable determination unit is further configured to calculate luminance values to be set for individual pixels forming the virtual object, based on luminance values of individual pixels included in the first video data.

12. The image processing apparatus according to claim 10, wherein in a case where a behavior of the virtual object satisfies a predetermined condition, the variable determination unit is further configured to determine the variable based on a distribution of luminance values of individual pixels included in the virtual object that is superimposed on the predetermined area and individual pixels that are not superimposed on the virtual object in the predetermined area, and in a case where the behavior of the virtual object does not satisfy a predetermined condition, the variable determination unit is further configured to determine the variable based on the distribution of the luminance values of individual pixels included in the predetermined area regardless of whether the superimposition of the virtual object is performed.

13. The image processing apparatus according to claim 1, wherein the first video data is spherical content, the image processing apparatus further comprises an area determination unit configured to perform projection conversion on a partial area of the spherical content specified based on the motion of the user and determine an area corresponding to an image obtained after the projection conversion, as the predetermined area, and the area determination unit is implemented via at least one processor.

14. The image processing apparatus according to claim 1, further comprising a display control unit configured to control display of the second video data obtained by conversion by the converter, wherein the display control unit is implemented via at least one processor.

15. An image processing method, by a computer, comprising:

performing, based on a distribution of luminance values of individual pixels included in a predetermined area determined according to information regarding a motion of a user out of first video data recorded in a first dynamic range, determination of a variable to be used to calculate the luminance values of the individual pixels when the first dynamic range is converted into a second dynamic range;

converting the first video data into second video data displayed in the second dynamic range, based on the determined variable; and determining the variable based on a distribution of luminance values of individual pixels included in a virtual object that is superimposed on the predetermined area.

16. A non-transitory computer readable recording medium, which when executed by a computer causes the computer to execute an image processing method, the method comprising:

performing, based on a distribution of luminance values of individual pixels included in a predetermined area determined according to information regarding a motion of a user out of first video data recorded in a first dynamic range, determination of a variable to be used to calculate the luminance values of the individual pixels when the first dynamic range is converted into a second dynamic range;

converting the first video data into second video data displayed in the second dynamic range, based on the determined variable; and determining the variable based on a distribution of luminance values of individual pixels included in a virtual object that is superimposed on the predetermined area.

* * * * *